United States Patent [19]

Anahara et al.

[11] Patent Number: 5,137,058

[45] Date of Patent: Aug. 11, 1992

[54] THREE DIMENSIONAL FABRIC AND METHOD FOR PRODUCING THE SAME

[75] Inventors: Meiji Anahara; Yoshiharu Yasui; Hiroshi Omori, all of Aichi, Japan

[73] Assignee: Kabushiki Kaisha Toyoda Jidoshokki Seisakusho, Kariya, Japan

[21] Appl. No.: 646,719

[22] PCT Filed: May 25, 1990

[86] PCT No.: PCT/JP90/00673

§ 371 Date: Jul. 29, 1991

§ 102(e) Date: Jul. 29, 1991

[87] PCT Pub. No.: WO90/14454

PCT Pub. Date: Nov. 29, 1990

[30] Foreign Application Priority Data

May 26, 1989 [JP] Japan ................................. 1-133695

[51] Int. Cl.$^5$ ............................................... D03D 3/00
[52] U.S. Cl. .................:........................ 139/384 R; 139/20;
139/DIG. 1; 428/257; 428/225
[58] Field of Search ...................... 139/384 R, 1 R, 35,
139/20, 383 R, DIG. 1; 428/257, 225

[56] References Cited

U.S. PATENT DOCUMENTS

| | | | |
|---|---|---|---|
| 4,019,540 | 4/1977 | Holman et al. ........................ | 139/20 |
| 4,725,485 | 2/1988 | Horokawa ............................ | 428/225 |
| 5,024,874 | 6/1991 | Yasui et al. ........................... | 428/257 |
| 5,080,141 | 1/1992 | Bottger et al. ........................ | 428/225 |

Primary Examiner—James J. Bell
Attorney, Agent, or Firm—Brooks Haidt Haffner & Delahunty

[57] ABSTRACT

The present invention relates to a three dimensional fabric including a warp layer consisting of a plurality of warps arranged in parallel along a longitudinal direction of the fabric, bias threads arranged in inclined directions with respect to the longitudinal direction of the fabric in a place parallel to the warp layer, and a vertical thread arranged in a thicknesswise direction of the fabric such that it perpendicularly intersects the warps. It also relates to a method of producing the fabric. Where such fabric is employed for a composite material in which a resin or the like is used as a matrix, the composite material deforms less under the influence of forces acting in an oblique direction. It therefore has an increased range of applications as a structural material comparing with a conventional 3-axis three dimensional fabric. Further, the subject of the present invention resides in provision of a three dimensional fabric having an arrangement of threads of such bias directions and a producing process by which such three dimensional fabric can be produced comparatively readily. A bias thread layer is composed of a large number of continuous bias threads which are arranged such that they are inclined symmetrically to each other with respect to a longitudinal direction of the fabric in a plane parallel to the warp layer. Each pair of bias thread layers make a set. The engaging positions of the bias threads with a set made of each two thereof which are in an engaging condition with engaging portions of a feeding device disposed between the cloth fell position and a bias thread supplying section are moved by a predetermined pitch in opposite directions to each other for each of the bias thread layers along widthwise directions of the fabric by an action of the feeding device. Such movement of the engaging positions and insertion of vertical threads are performed alternately.

10 Claims, 31 Drawing Sheets

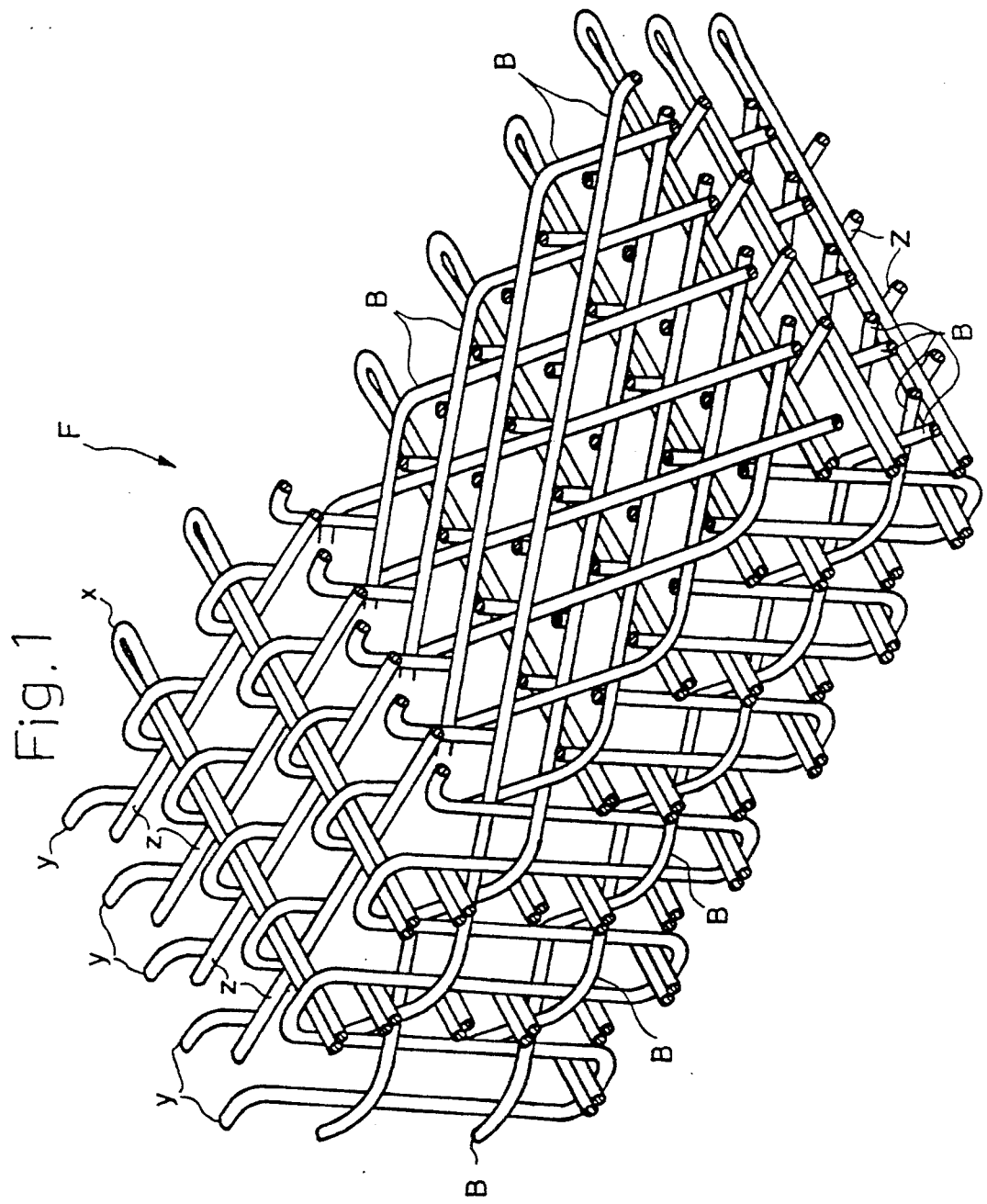

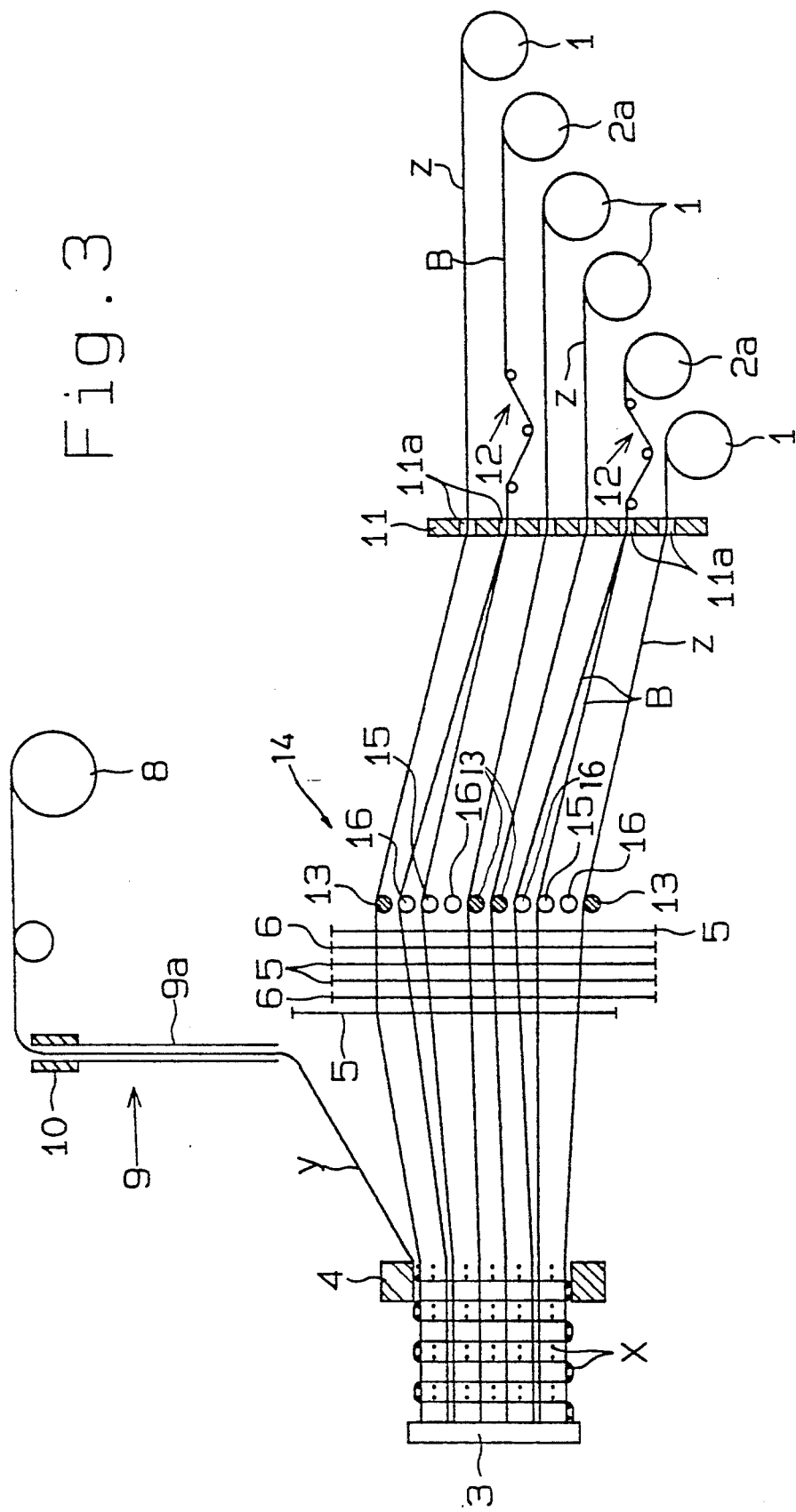

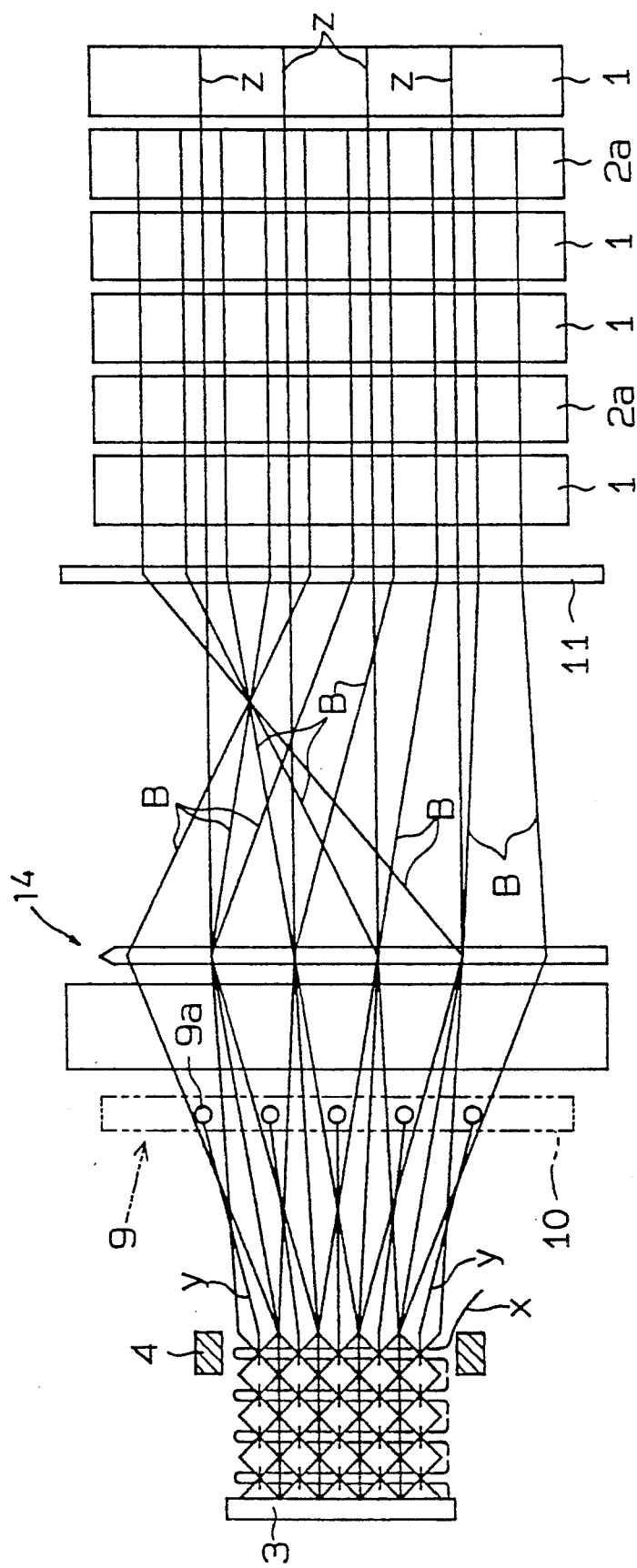

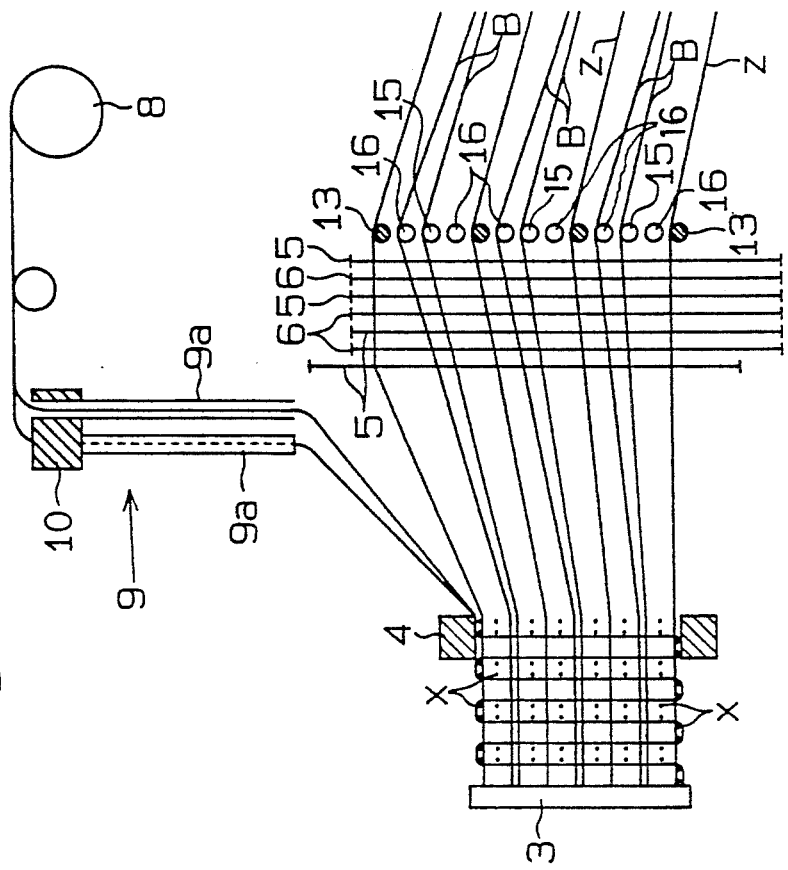
Fig. 42
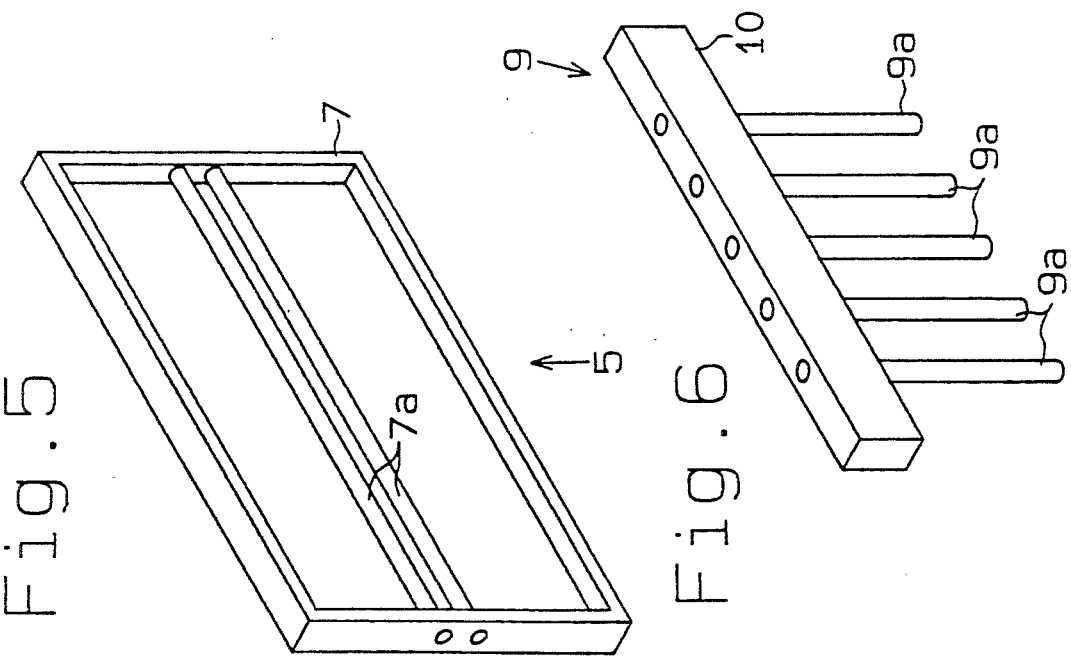
Fig. 5
Fig. 6

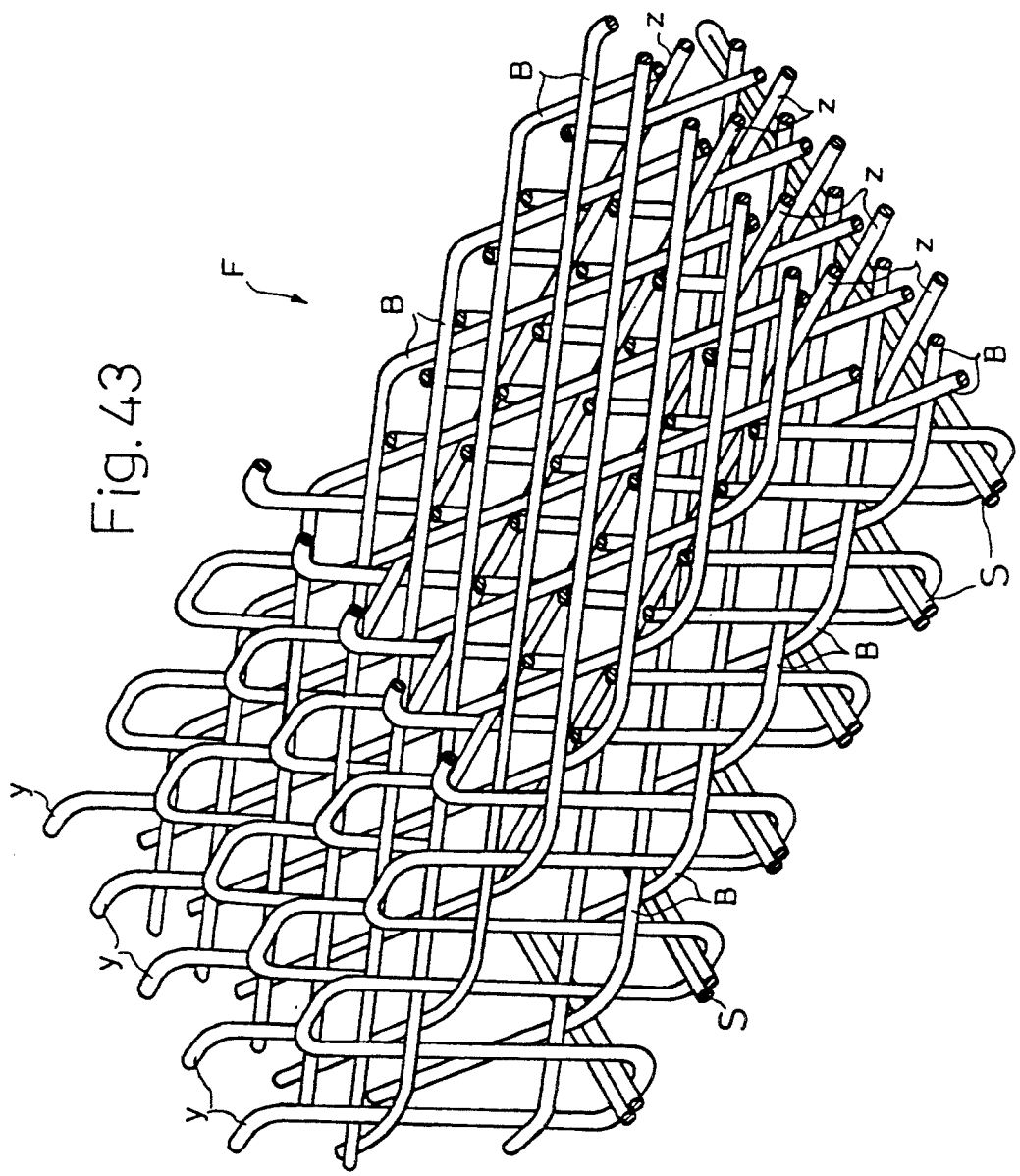

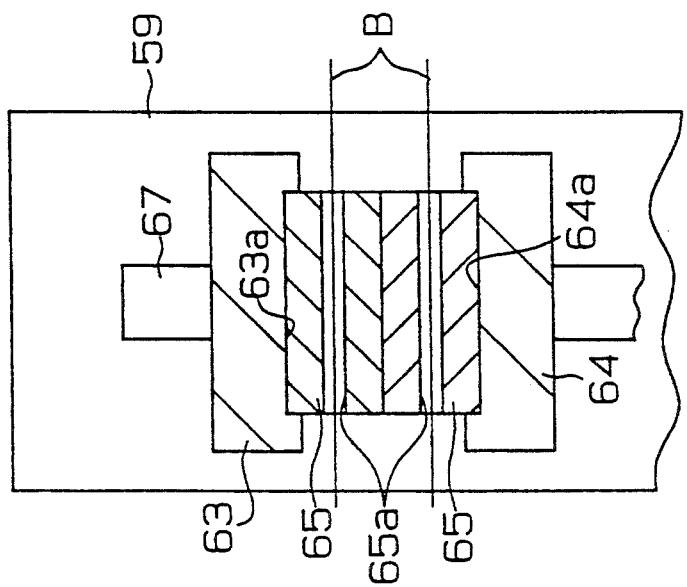
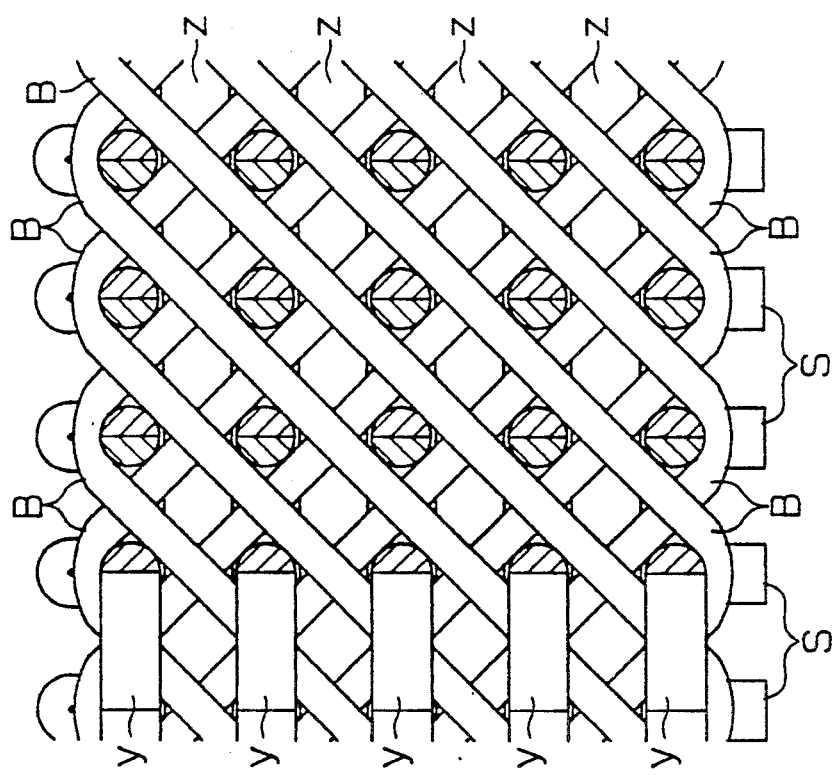

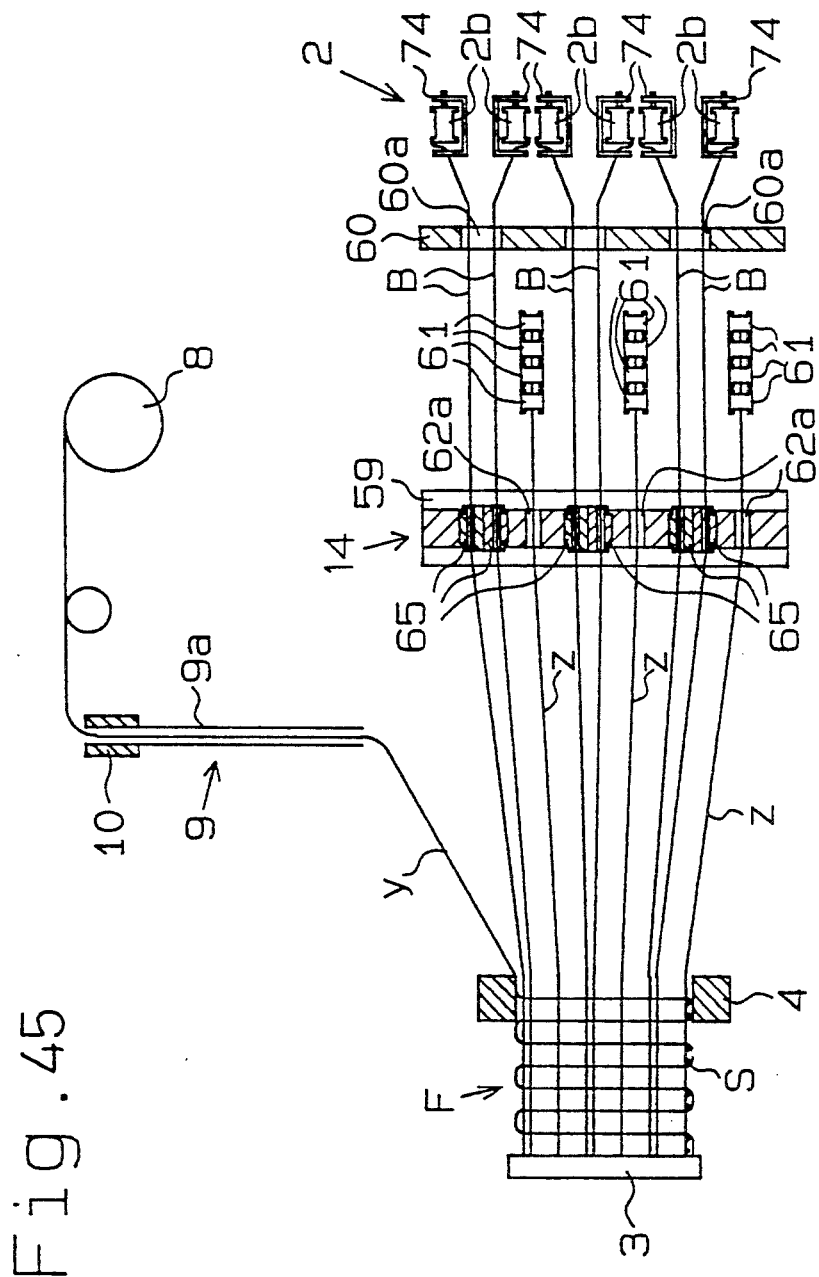

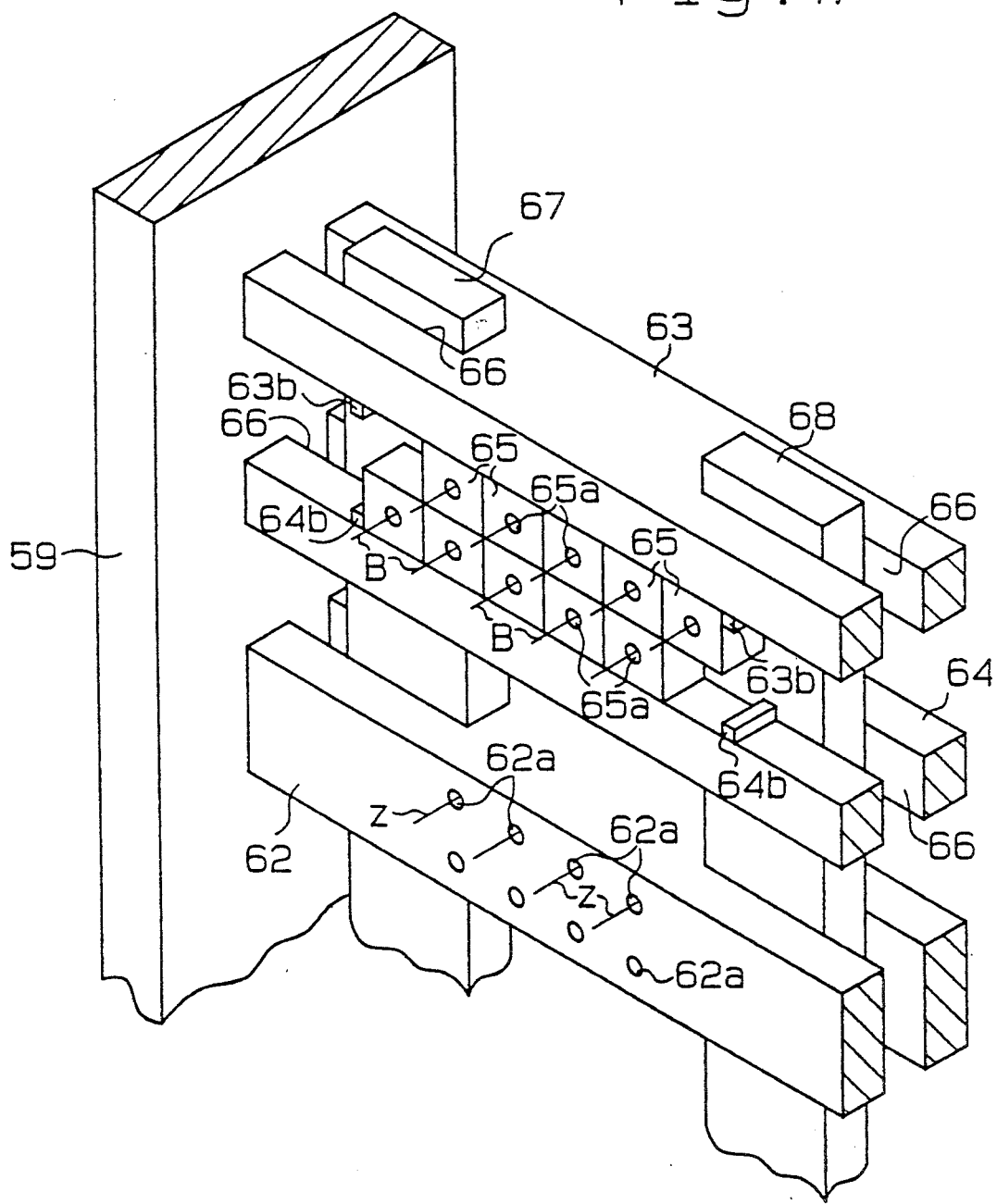

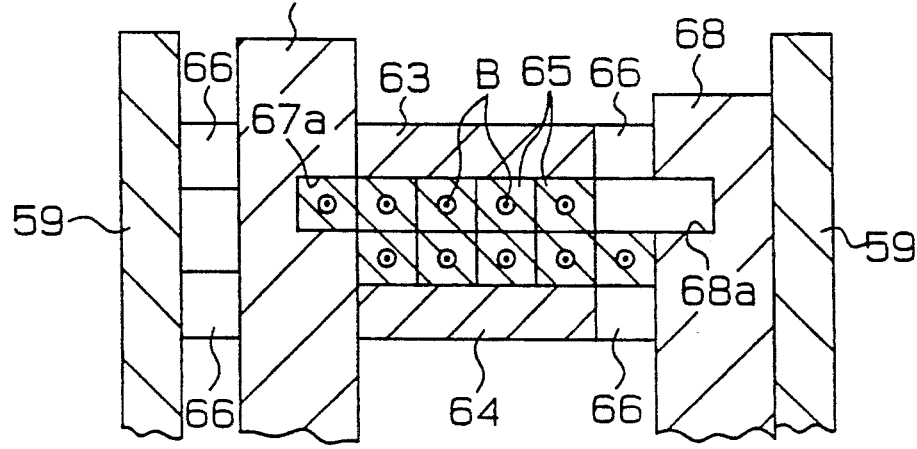
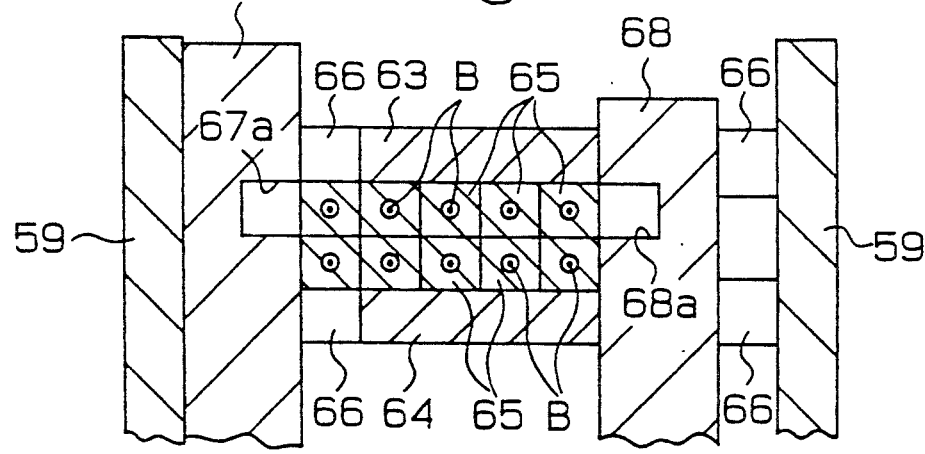
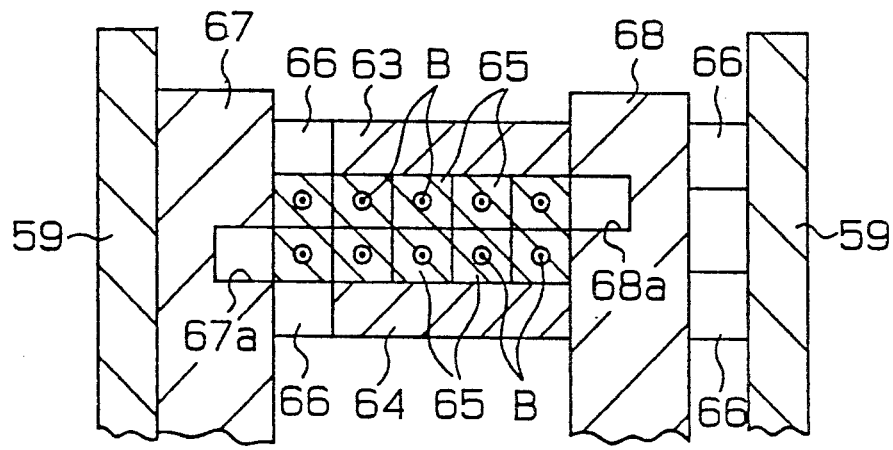

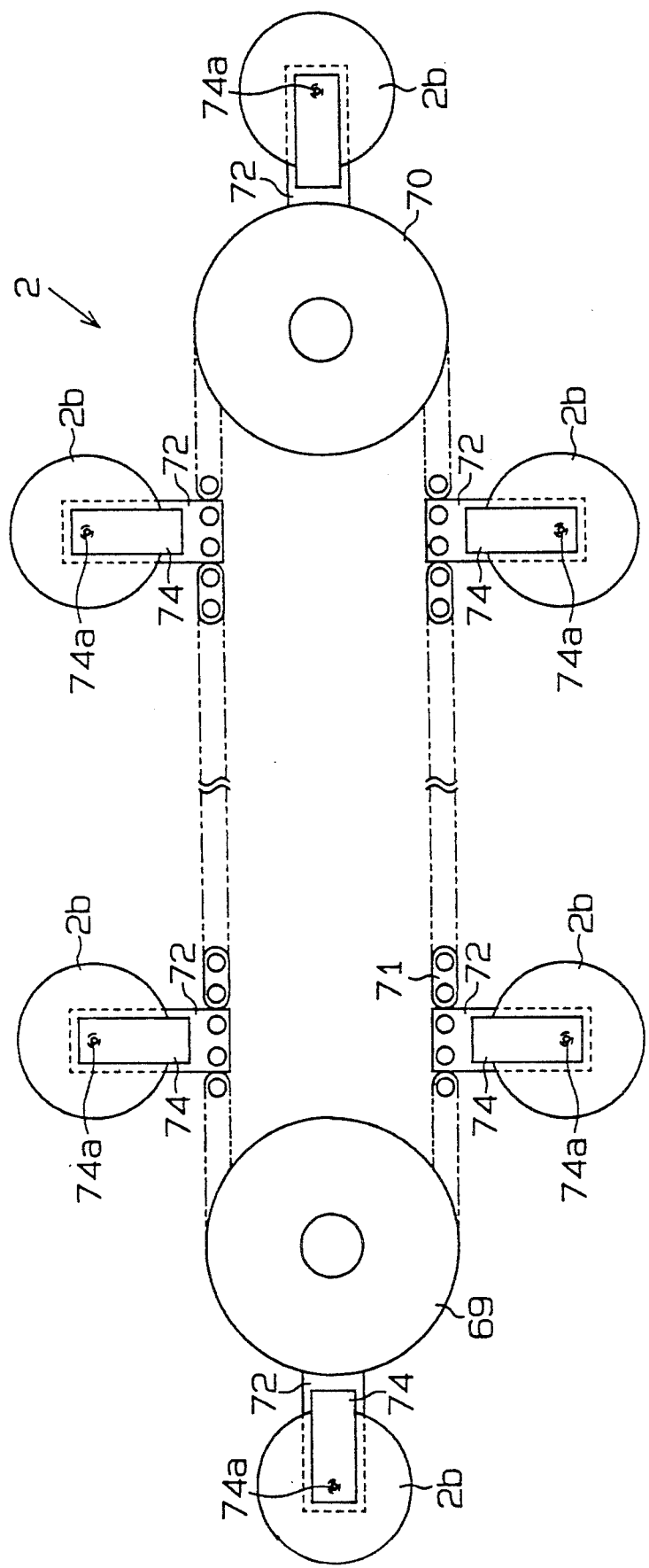

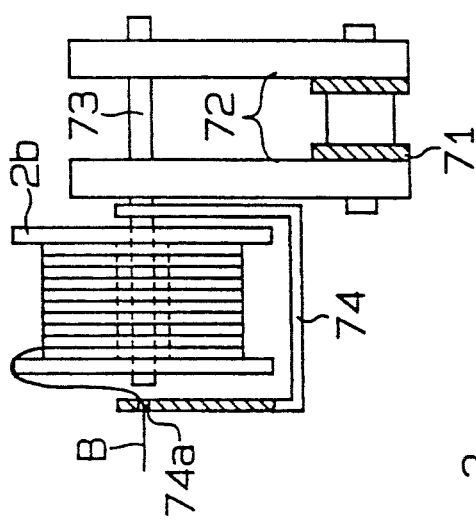
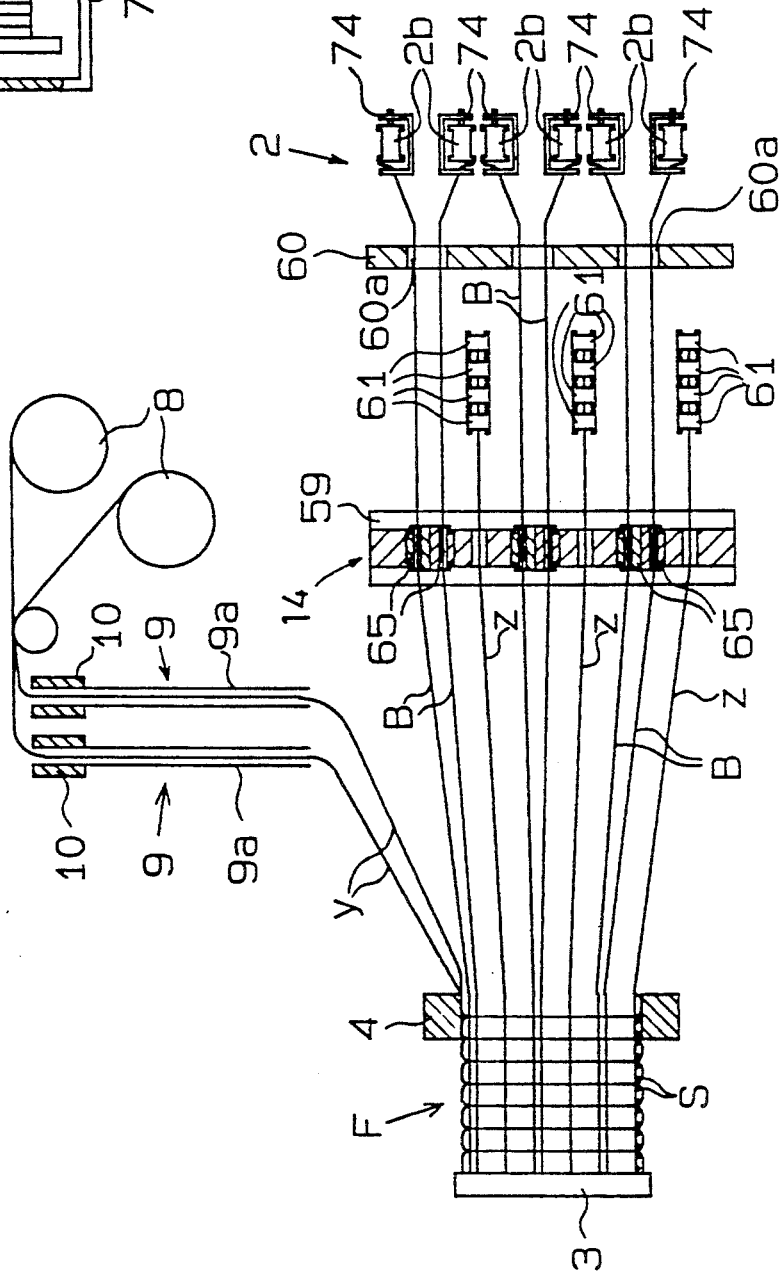

THREE DIMENSIONAL FABRIC AND METHOD FOR PRODUCING THE SAME

TECHNICAL FIELD

This invention relates to a three dimensional fabric including a warp layer comprising a plurality of warp strings arranged in parallel with a longitudinal direction of the fabric, bias threads arranged in inclined directions with respect to the longitudinal direction of the fabric in a plane parallel to the warp layer, and a vertical thread arranged in a thicknesswise direction of the fabric in a perpendicularly intersecting condition to the warp strings, and also to a method for producing the fabric.

BACKGROUND

Composite materials having a three dimensional fabric that includes threads extending in the X, Y and Z directions are expected to be widely used as structural materials for rockets, aircraft, automobiles, marine vessels and buildings. Such fabrics include a multiplicity of warp strings, and vertical threads and wefts woven perpendicularly in between columns and rows of the warp strings. The fabric is used as a core and impregnated with matrix of a resin or an inorganic substance.

Further, as a method for producing the three dimensional fabric of the type mentioned, various processes are conventionally proposed. (For example, Japanese Patent Publication No. 38673/1979 and Japanese Patent Publication No. 14624/1976). While three dimensional fabrics of the type mentioned are strong enough against tensile loads, compressive loads and bending loads acting in the X, Y and Z directions, they have the drawback that the amount of deformation caused by a force acting in an inclined direction with respect to the axial direction is great.

It is a first object of the present invention to provide a novel three dimensional fabric wherein the amount of deformation by a force acting in an inclined direction is decreased.

It is a second object of the present invention to provide a method for producing a three dimensional fabric readily.

DISCLOSURE OF THE INVENTION

In order to attain the first object described above, according to the present invention, there is provided a three dimensional fabric which comprises a warp layer consisting of a plurality of warp strings arranged in parallel with a longitudinal direction of the fabric, bias thread layers comprising a multiplicity of continuous bias threads arranged in such a manner as to be inclined symmetrically to each other with respect to the longitudinal direction of the fabric in a plane parallel to the warp layer, each pair of the bias thread layers making a set, and a plurality of vertical threads arranged perpendicular to the warp strings and in a thicknesswise direction of the fabric. A continuous vertical thread extend between adjacent columns of the warp layer and is arranged to run back and forth between the opposite outer sides of the columns.

In addition to the construction described above, a weft may be arranged in a widthwise direction of the fabric such that it extends perpendicular to the warp strings. When the three dimensional fabric having bias threads as described above, is used as a core of a composite material in which a resin or the like is used as a matrix, the amount of deformation by a force acting in an oblique direction upon the composite material is decreased by the action of the bias threads. This increase the range of applications for such a structural material. By using a large number of bias threads which are continous and folded back in the individual bias thread layers, it is easy to continously weave the three dimensional fabric. When the fabric is used for a composite material, the rigidity against a tensile load, a bending load and some other loads is high and the strength is improved.

With the three dimensional fabric wherein no weft is present, in-plane 3-axis and in-plane isotropy can be obtained by the warp strings and the bias threads which are arranged such that they are inclined symmetrically to each other with respect to the longitudinal direction of the fabric in a plane parallel to the warp layer. Compared to an in-plane 4-axis, totally 5-axis three dimensional fabric in which a weft exists, such three dimensional fabric is simple in structure. It is also possible to increase the thickness of the bias threads to increase the fiber orientation ratio of the bias threads. The bias threads which constitute each of the bias thread layers each two of which makes a set may be disposed either such that they have and inclination of one direction or such that they are inverted cyclically.

In and embodiment of the three dimensional fabric having a plurality of bias thread layer sets wherein at least one set of the bias thread layers are folded back intermediately of the full width of the fabric, it is easy to obtain a three dimensional fabric wherein the warp density in the widthwise direction of the fabric is uniform. Those of the bias thread layers of at least one set of the plurality of sets may be folded back with a predetermined width smaller than the width of the fabric such that the thickness of the fabric may vary in its widthwise direction. Further, the three dimensional fabric may have a plurality of sets of the bias thread layers each two of which make a set, and the inclination angle of the bias threads of those of the bias thread layers of at least one set may be different from the inclination angle of the bias threads of those of the bias thread layers of the other set or sets. With the construction, where the three dimensional fabric is usd as a core of a composite material, comparing with another composite material which employs a three dimensional fabric wherein individual bias threads of a plurality of sets of bias thread layers have the same inclination angle, the in-plane uniformity is improved and the amount of deformation by a force acting in an oblique direction upon the composite material is further reduced. Consequently, the a wide variety of applications as a structural material is realized.

In order to attain the second object, according to a producing process of the present invention, a plurality of warp strings are stretched in a plurality of layers in a thicknesswise direction of the fabric such that they extend in a longitudinal direction of the fabric. A plurality of bias threads are stretched in parallel to the warp layers such that each two layers may make a set. A vertical thread is inserted in the thicknesswise direction of the fabric and a loop is formed at an end thereof. A selvage thread is inserted into the end loop of the vertical thread. Then the vertical thread is drawn back. When the vertical thread is postioned outside the warp strings and the bias threads, the action of a feeding device moves each pair of bias threads to an engaging position. The feeding device is positioned between the coil fell position anf a bias thread supplying section and is oriented in the widthwise direction of the fabric. The engaging positions of a pair of bias thread layers engage with the engaging portions of the feeding device. These bias thread engaging positions are moved by a predetermined pitch in opposite directions along the widthwise direction of the fabric to arrange the bias threads obliquely with respect to the longitudinal direction of the fabric. Thereafter, insertion of the vertical thread is performed again. With this construction, a 4-axis three dimensional fabric can be woven. Since movement of the bias threads in the widthwise directions is performed by a simple method, wherein the engaging portions of the feeding device disposed between the bias thread supplying section and the cloth fell position are moved in the predetermined direction, the device for carrying out this method is simplified.

According to another structure, a plurality of warp strings are stretched in a plurality of layers in a thicknesswise direction of the fabric in a condition wherein they extend in a longitudinal direction of the fabric. A plurality of bias threads are stretched in parallel to the warp layers such that each two layers may make a set. Insertion of a vertical thread in the thicknesswise direction of the fabric and insertion of a weft in a widthwise direction of the fabric are performed. After completion of insertion of the weft by one cycle, the vertical thread connecting to the fabric being woven is disposed outside the warp strings and the bias threads. An action of a feeding device arranged in the widthwise direction of the fabric between the cloth fell position and a bias thread supplying section, the engaging positions of the bias threads which are in an engaging condition with engaging portions of the feeding device are moved by a predetermined pitch in opposite directions to each other for each of the bias thread layers along the widthwise direction of the fabric to arrange the bias threads obliquely with respect to the longitudinal direction of the fabric; and then insertion of the vertical thread is performed again. With the present structure, a 5-axis three dimensional fabric is produced.

Where the processing process is constituted such that, when the bias threads are to be arranged obliquely with respect to the longitudinal direction of the fabric, by an action of a feeding device which is arranged in the widthwise direction of the fabric between the cloth fell position and the bias thread supplying section and wherein engaging portions which are provided at two stages so that they may be engaged with the bias threads of each of the bias thread layers are circulatively moved in a predetermined direction along a moving route in the form of loop extending in the widthwise direction of the fabric, the engaging positions of the bias threads which are in an engaging condition with the engaging portions of the feeding device are moved in the opposite directions to each other between adjacent ones of the bias thread layers while the bias threads connecting from the engaging portions to the bias thread supplying section are moved, upon movement of the engaging portions, in the same direction, the bias threads of the two adjacent upper and lower layers which connect from the cloth fell to the supplying section by way of the individual engaging portions are always kept in a parallel condition, and the bias threads of each layer are arranged obliquely with respect to the longitudinal direction such that they may have inclinations of one direction.

Further, where the bias threads each two of which make a set are stretched by a plurality of sets and, when the bias threads are to be arranged obliquely with respect to the longitudinal direction of the fabric by an action of a feeding device, the feeding pitch of a feeding device corresponding to at least one of the plurality of sets of the bias threads is made different from the feeding pitch of any other feeding device, such bias threads are arranged obliquely at a different inclination angle from the other bias threads.

BRIEF DESCRIPTION OF THE DRAWINGS

FIGS. 1 to 21 show a first embodiment of the present invention. FIG. 1 is a partially broken away schematic perspective view of a three dimensional fabric;

FIG. 2 is a partially broken away plan view, of the three dimensional fabric;

FIG. 3 is a schematic side elevational sectional view showing a weaving condition of the three dimensional fabric;

FIG. 4 is a schematic plan view of the same;

FIG. 5 is a schematic perspective view of a shedding device;

FIG. 6 is a schematic perspective view of a vertical thread rapier;

FIG. 7 is a schematic perspective view showing an engaging condition between bias threads and screw shafts;

FIGS. 8 to 15 are schematic sectional views illustrating operation of a bias thread feeding device;

FIGS. 16 to 21 are schematic side elevational views illustrating a weaving operation.

FIG. 22 is a schematic perspective view, partly broken, of a three dimensional fabric;

FIGS. 23 to 27 are schematic side elevational views illustrating a weaving operation;

FIG. 30 is a schematic perspective view, partly broken away, of a three dimensional fabric;

FIG. 31 is a plan view, partly broken away, of the three dimensional fabric;

FIGS. 32 and 33 are schematic sectional views showing a set condition of bias threads to screw shafts.

FIG. 34 is a plan view, partly broken, of a three dimensional fabric;

FIG. 35 is schematic sectional view showing a set condition of bias threads to screw shafts;

FIG. 36 is a schematic perspective view, partly broken away of a three dimensional fabric;

FIGS. 37 to 39 are plan views, partly broken away, of the three dimensional fabric;

FIGS. 40 and 41 are schematic sectional views showing a set condition of bias threads to screw shafts;

FIG. 42 is a schematic side elevational view of a sixth embodiment.

FIGS. 43 to 60 show a seventh embodiment.

FIG. 43 is a schematic sectional view, partly broken away, of a three dimensional fabric;

FIG. 44 is a plan view, partly broken away, of the three dimensional fabric;

FIG. 45 is a schematic side elevational sectional view illustrating a weaving condition of the three dimensional fabric;

FIG. 46 is a schematic plan view of the same;

FIG. 47 is a schematic view of essential part of a bias thread feeding device;

FIG. 48 is a sectional view illustrating the relationship between rails and guide blocks;

FIGS. 49 to 54 are sectional views illustrating operation of the bias thread feeding device;

FIG. 55 is a schematic front elevational view of a bias thread supplying section;

FIG. 56 is a sectional view illustrating a supporting condition of a bias thread bobbin; FIGS. 57 to 60 are schematic side elevational views illustrating a weaving operation;

FIGS. 61 to 64 show an eighth embodiment.

FIG. 61 is a schematic side elevational sectional view illustrating a weaving condition;

FIG. 62 is a plan view of the same;

FIG. 63 is a schematic perspective view of a three dimensional fabric; and

FIG. 64 is a plan view, partly broken, of the three dimensional fabric.

BEST MODE FOR CARRYING OUT THE INVENTION

In the following, the present invention will be described more in detail with reference to the drawings.

EMBODIMENT 1

First, a first embodiment of a 5-axis three dimensional fabric and a method for producing the same will be described with reference to FIGS. 1 to 21.

Figure 2:
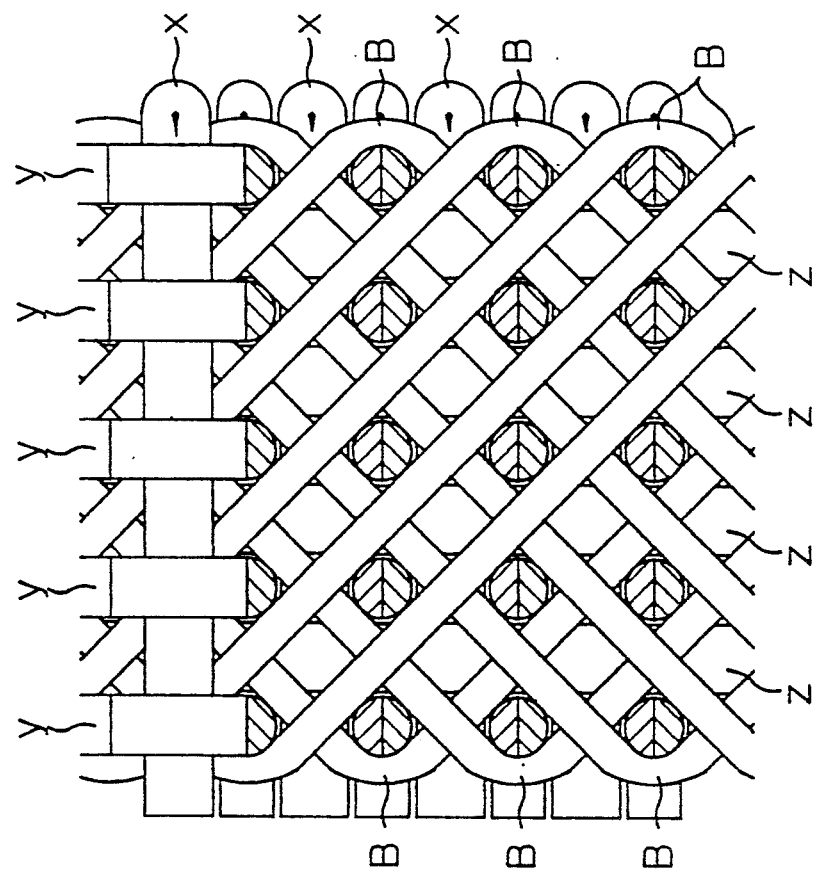

As shown in FIGS. 1 and 2, a three dimensional fabric F is includes a warp layer having a multiplicity of warp strings z stretched in a plurality of columns and a plurality of rows (four columns and three rows in the figures). The warp strings z extend in parallel with a longitudinal direction of the three dimensional fabric F. A multiplicity of vertical threads y are woven perpendicular to the warp strings in between adjacent columns. Thus the vertical threads are arranged in a widthwise direcion relative to the fabric such that they are continuous for the individual columns. A multiplicity of bias threads B are arranged in between the individual rows of the warp strings z such that they are symmetrically aligned with respect to the longitudinal direction of the frabric in a plane parallel to the warp layer. The bias threads B are folded back continuously at the opposite ends of the fabric F. Wefts x extend in widthwise directions of the fabric between the warp layer and a bias threads layer. The wefts x run perpendicular to the warp strings z. Each of the vertical threads y is vertically folded back to form loops at ends and inserted to between two adjacent warp strings z. A weft x is inserted in the end loop of such vertical thread y in order to prevent coming off of the end loop. Also each of the wefts x is folded to form an end loop and inserted between the thread y. Meanwhile, the bias threads B are arranged in a zigzag pattern, respectively, so as to be folded back at widthwise end portions of the three dimensional fabric F such that two layers thereof may make a set, and they are arranged in such a condition that the bias threads B in an upper layer and bias threads B in a lower layer intersect each other.

In FIG. 1, the warp strings z, wefts x, vertical threads y and bias threads B are illustrated as being spaced from each other in order to clearly indicate structure of the three dimensional fabric F. Actually, however, the threads are arranged closely to each other as shown in FIG. 2. Further, where rovings such as carbon fiber with little twist are used for each of the threads, wefts x and vertical threads y which are individually inserted in a folded condition forming a loop at an end thereof is overlapped, after weaving, with each other into a single string and integrated with each other as shown in FIG. 2.

The three dimensional fabric F is used as a composite material in which a resin or the like is impregnated. Due to the presence of such bias threads arranged in inclined directions with respect to the longitudinal direction of the fabric, the amount of deformation by a force acting in an inclined direction is decreased in comparison with a composite material employing a conventional 3-axis three dimensional fabric as a core. The structure has paired bias thread layer sets which are composed of a large number of continuously folded back bias threads B. When the fabric F is used in a composite material, it has a high rigidity against tensile loads, compressive loads, bending loads and some other loads and also has improved strength.

An apparatus for weaving such a three dimensional fabric is shown in FIGS. 3 and 4. It concludes, a warp supplying section including a number of warp beams 1 corresponding to the number of the rows of the warp strings z, and a bias thread supplying section including a number of bias thread beams 2a which is equal to one half the number of the bias thread layers. A thread supporting plate 3 has end portions of the multiplicity of warp strings z and bias threads B fastened thereto. The warp strings z are drawn out from the warp beams 1 and the bias threads B are drawn out from the bias thread beams 2a. As weaving proceeds, the thread supporting plate is moved in a direction to draw up the three dimensional fabric F (to the left in FIGS. 3 and 4) by operation of a driving mechanish (not shown ) from a position in the proximity of a cloth fell fram 4 disposed at a predetermined location. Warp shedding devices 5 and bias thread shedding devices are disposed to the rear of the cloth fell frame 4 (to the right in FIGS. 3 and 4).

Each of the warp shedding devices 5 includes, as shown in FIG. 5, a frame 7 having a width greater than that of the three dimensional fabric and having a height greater than the thickness of the three dimensional fabric. A pair of guide rods 7a are secured to the frame 7 in a spaced relationship by a distance sufficient to allow passage of the warp strings z therebetween. The warp shedding devices 5 are moved up and down by a driving mechanism (not shown). The bias thread shedding devices 6 are substantially similar in construction to the warp shedding device 5. the distance between a pair of guide rods 7a is set greater than that of the warp shedding device 5 so that the bias threads B do not contact the guide rods 7a when a bias thread feeding device (described below) operates.

A vertical thread rapier 9 is disposed between the cloth fell frame 4 and the warp shedding devices 5 and acts to insert, upon upward and downward movement thereof, the vertical threads y. The vertical threads are drawn out from a vertical thread supplying section 8 between individual adjacent columns of the warp strings z. As shown in FIG. 6, the vertical thread rapier 9 includes a support body 10 which is moved up and down by a driving mechanism (not shown), and a plurality of pipes 9a fitted in the support body 10. A predetermined number of vertical threads y are simultaneously threaded in each column of the warp strings z.

A guide plate 11 is disposed in front of the warp beams 1 and guides the warp strings z and the bias threads B drawn out from the warp beams 1 and the bias thread beams 2a, respectively. The guide plate 11 has a plurality of guide holes 11a formed at locations corresponding to upper ends of the warp beams 1 and the bias thread beams 2a for guiding the warp strings z and the bias threads B one by one therethrough. A tension adjusting device 12 (shown on in FIG. 3) is provided between the guide plate 11 and each of the bias thread beams 2a for each of the bias threads B drawn out from the bias thread beams 2a.

Figure 7:
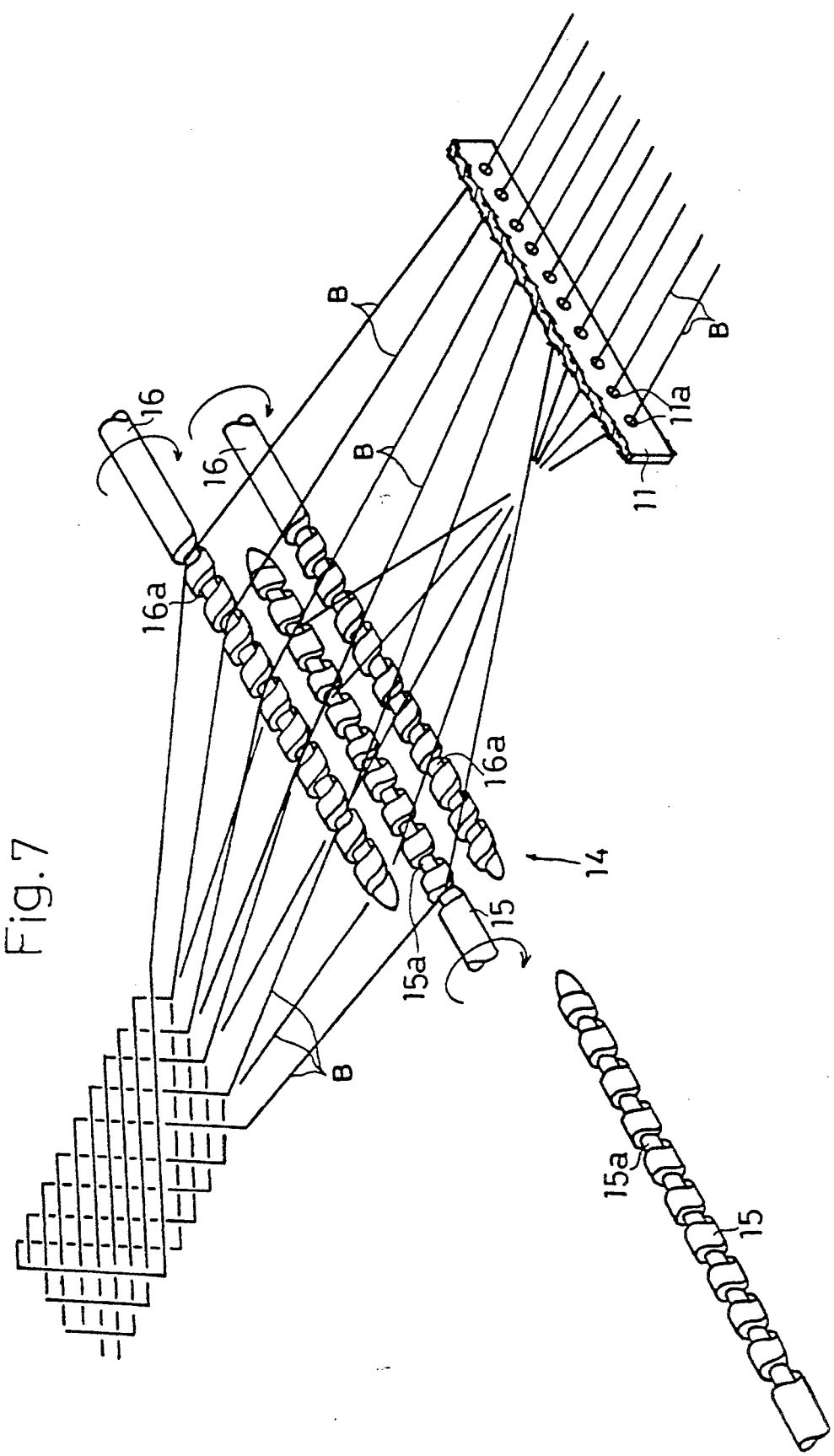

Warp guides 13 and bias thread feeding device 14 are disposed behind the two shedding devices 5 and 6. The warp guides 13 are formed from rods which are disposed at predetermined locations. Each warp guide has guide grooves formed at a predetermined spaced relationship on a surface thereof. As shown in FIG. 7, the bias thread feeding device 14 includes two pairs of schrew shafts 15 and 16. The shaft screws have spiral grooves 15a and 16a respectively which are formed in opposite directions. The two pairs of screw shafts 15 and 16 are disposed for individual movement between an operative position and a retracted position. In the operative position, the shafts 15, 16 extend in parallel to the widthwise direction of the three dimensional fabric and may individually engage the bias threads B. In the retracted position, the shafts 15, 16 do not engage the bias threads B. The three screw shafts 15 and 16 which are at the engaged position can be disposed alternately in the up and down directions.

The wefts x are inserted between adjacent rows of the warp strings z or between a row of warp strings z and a layer of the bias threads B. The end of each wefts is formed into a loop and inserted in a folded condition by a weft rapier 17 (shown in FIGS. 18 and 20). The rapier 17 has a beating function.

The weaving of a three dimensional fabric using the apparatus having the described structure will be described hereinafter.

Figure 8:
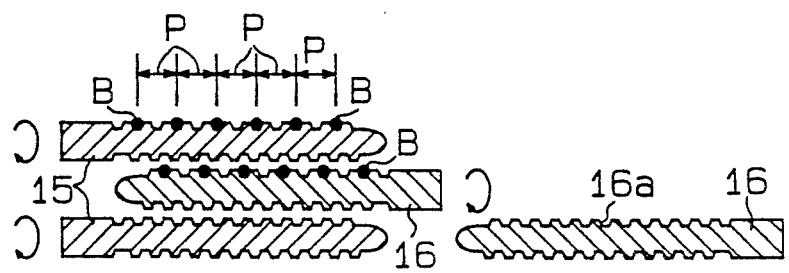
Figure 9:
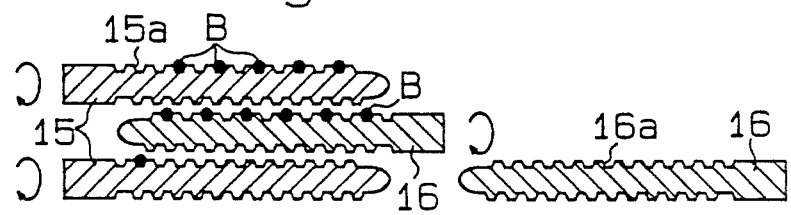

First, the feeding operation of the bias threads B by the bias thread feeding device 14 will be described. Lateral movement of the bias threads B in the width direction of the fabric is performed by rotating three of the screw shafts 15 and 16 in the same direction. The screw shafts are disposed at three vertical stages such that they extend in horizontal directions. As shown in FIG. 8, the three screw shafts 15 and 16 are disposed at the three vertical stages and extend in horizontal directions while the remaining screw shaft 16 is disposed at its retracted position. In the above condition, the bias threads B are arranged to engaged the spiral grooves 15a and 16a in the upper and middle state shaft screws at a predetermined pitch P. If the operative screw shafts 15 and 16 are driven to rotate by two rotations in the same direction, the bias threads B held in egagement with the screw shaft 15 at the upper stage are moved one pitch P to the right. Meanwhile, the bias threads B held in engagement with the screw shaft 16 at the middle stage are moved by one pitch P to the left. Thereupon, the bias thread B held in engagement with the spiral groove 16a adjacent an end of the screw shaft 16 disposed at the middle stage is disengaged from the screw shaft 16 and is now brought into engagement with the spiral groove 15a adjacent a base end of the screw shaft 15 disposed at the lower stage. Meanwhile, the bias thread B at an end of the screw shaft 15 disposed at the upper stage is transferred to a location of a base end portion of the screw shaft 16 at the middle stage so that a condition of FIG. 9 is entered.

Figure 10:
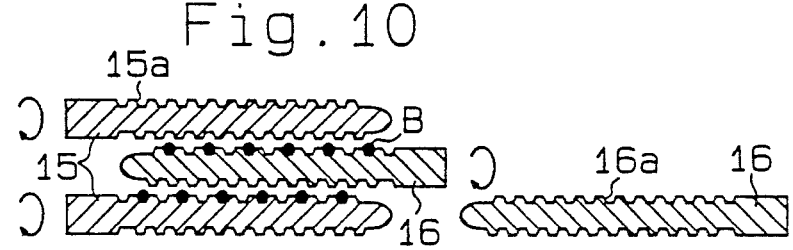
Figure 11:
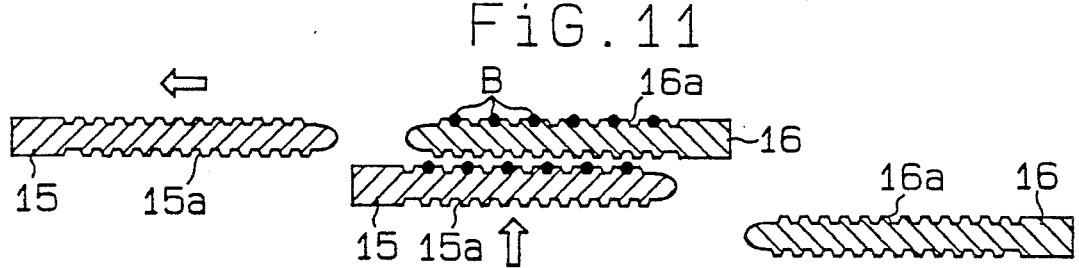
Figure 12:
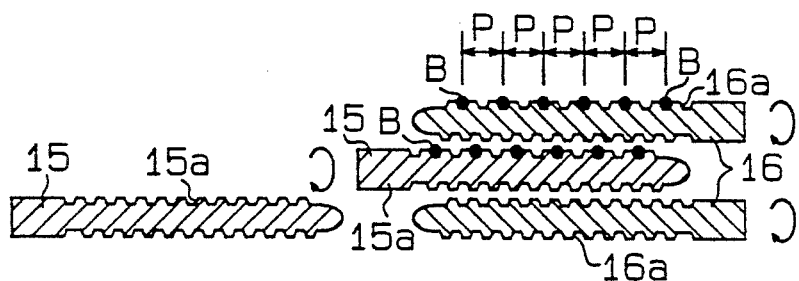
Figure 13:
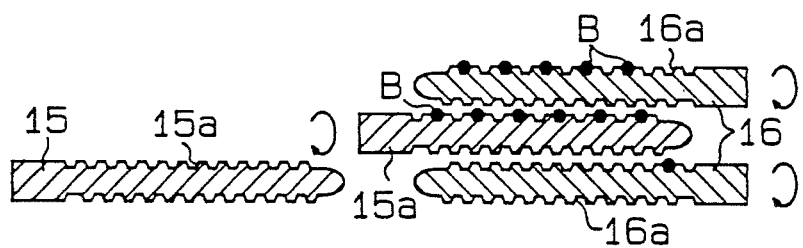

The screw shafts 15 and 16 disposed at the operative positions are totated to successively perform lateral feeding of the bias threads B in a similar manner. Then, the bias threads B which have been in engagement with the screw shaft 16 at the middle stage in the condition shown in FIG. 8 are all transferred to the screw shaft 15 disposed at the lower stage. Meanwhile, the bias threads B which have been in engagement with the screw shaft 16 at the middle stage so that a condition shown in FIG. 10 is entered. After all of the bias threads B which have been in engagement with the screw shaft 15 disposed at the upper stage are transferred from the screw shaft 15, the screw shaft 15 is moved backwardly to its retracted position as shown in FIG. 11. At the same time, the screw shaft 16 which has been disposed at the middle stage and the screw shaft 15 which has been disposed at the lower stage are now moved upwardly by one stage distance to the upper stage and the middle stage, respectively. Then, the remaining screw shaft 16 which has been disposed at the retracted position at the lower stage is moved forwardly to the operative position at the lower stage. Meanwhile, the screw shaft 15 is moved downward from the retracted position at the upper stage to the retracted position at the lower stage to the position shown in FIG. 12.

With the rotation of the screw shafts 15 and 16 in the same direction as described above, the bias threads B remaining in engagement with the screw shaft 15 disposed now at the middle stage are successively moved to the right by one pitch while they are successively transferred to the screw shaft 16 disposed at the lower stage. Meanwhile, the bias threads B remaining in engagement with the screw shaft 16 disposed at the upper stage are moved to the left while they are successively transferred to the screw shaft 15 disposed at the middle stage.

Figure 14:
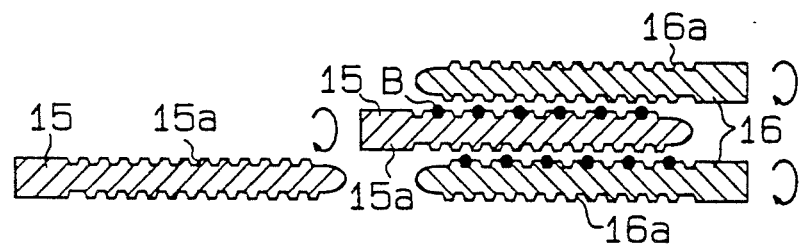
Figure 15:
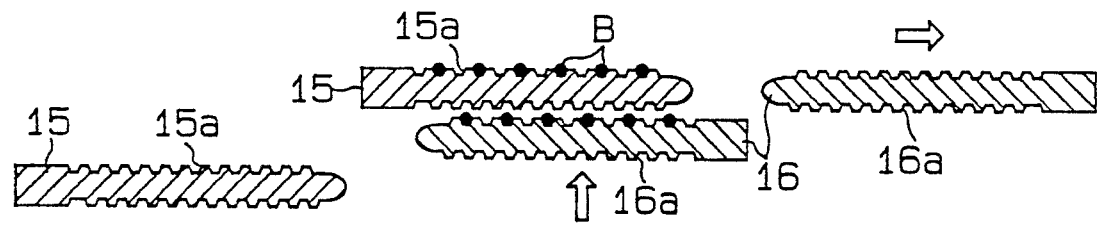

After all of the bias thread B which have been in engagement with the screw shaft 16 disposed at the upper stage are transferred to the screw shaft 15 disposed at the middle stage as shown in FIG. 14. Then, the screw shaft 16 at the upper stage is moved backwardly to its retracted position while the screw shaft 15 disposed at the middle stage. Meanwhile, the screw shaft 16 disposed at the lower stage are shifted upwardly by one stage distance to the upper stage and the middle stage, respectively, as shown in FIG. 15. Then, the screw shaft 15 which has been disposed at the retracted position at the lower stage is disposed now to the operative position. Then the screw shaft 16 which has been disposed to the retracted position at the upper stage is moved downward to the retracted position at the lower stage so that the condition shown in FIG. 8 is restored.

Thereafter, lateral feeding operation of the bias threads B is performed successively in a similar manner. While the lengths of the bias threads B along routes thereof between the guide plate 11 and the cloth fell are varied to a great extent by lateral feeding of the bias threads B, the tension of the bias threads B is kept substantially constant by an action of the tension adjusting devices 12.

Subsequently, a weaving procedure will be described hereinafter. Upon starting of weaving of a three dimensional fabric, the yarn supporting plate 3 is disposed at a position in the proximity of the weaving front frame 4. Warp strings z and bias threads B drawn out from the warp beam 1 and the bias thread beam 2a, respectively, are set to be threaded through the guide holes 11a of the guide plate 11. The warp guides 13 or bias thread feeding device 14 and the warp shedding devices 5 or bias thread shedding devices 6 are fastened to the yarn supporting plate 3.

Figure 16:
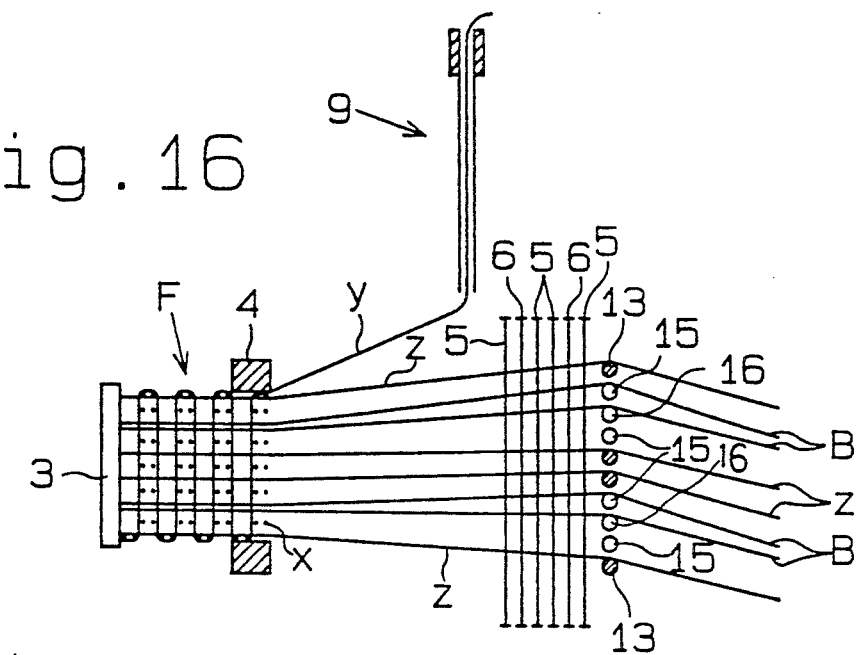
Figure 17:
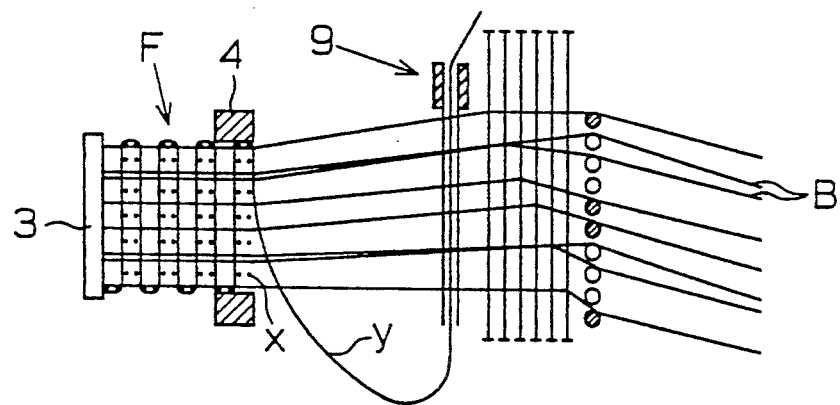

FIG. 16 illustrates a condition after completion of insertion of wefts x for the fourth layer from the left of a three dimensional fabric F. In this condition, the vertical thread rapier 9 is disposed at its lifted position while the warp shedding device 5 and the bias thread shedding devices 6 are all disposed at the respective lowered positions. In the condition wherein the bias thread shedding devices 6 are disposed at their lowered positions, the guide rods 7a of each of the bias thread shedding devices 6 are disposed at positions at which they are not engaged with a bias thread B inserted between the pair of guide rods 7a. In this condition, the bias thread feeding device 14 is driven in such a manner as described hereinabove, and each of the bias threads B is moved by one pitch P in a widthwise direction of the three dimensional fabric. Subsequently, as shown in FIG. 17, all of the warp shedding devices 5 and the bias thread shedding devices 6 are disposed at their lifted positions while the vertical thread rapier 9 is moved downward so that a vertical thread y is inserted between each pair of adjacent columns of the warp strings z. Thereafter, each of the pipes 9a of the vertical thread rapier 9 is inserted, as shown in FIG. 4, between bias threads B to the rear of an intersecting portion of the bias threads B disposed in a mutually intersecting condition, i.e., adjacent the bias thread shedding devices 6.

Figure 18:
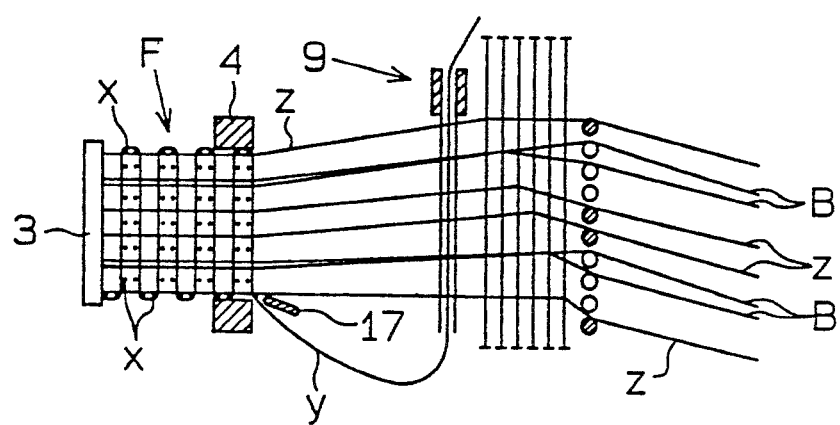

Subsequently, insertion of a weft x is performed between a warp z at the lower most stage and the vertical thread y by the weft rapier 17 having a beating up function. Since the vertical thread rapier 9 is spaced from the position of the cloth fell, a downwardly directed portion of the vertical thread y is not pressed to the cloth fell position only by downward movement of the vertical thread rapier 9. Rather they are pressed by insertion of the weft x to the lowermost stage. The downwardly directed portion of the vertical thread y is disposed at the cloth fell position in a perpendicularly intersecting condition with the warp z as shown in FIG. 18. It is to be noted that, before insertion of the weft x is performed, beating may be performed to move the vertical thread y toward the cloth fell side.

Figure 19:
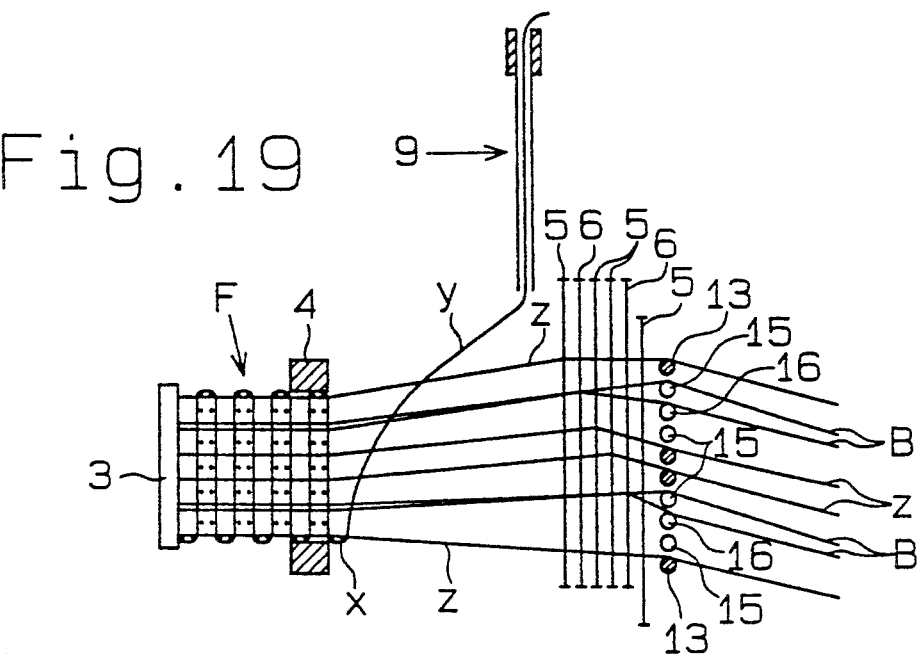
Figure 20:
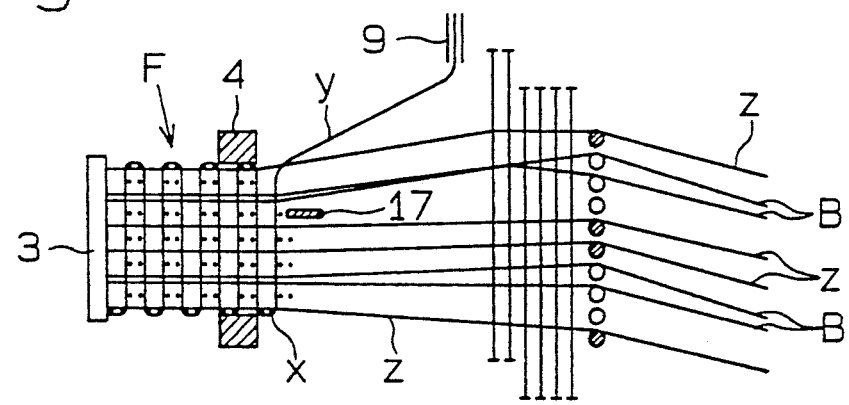
Figure 21:
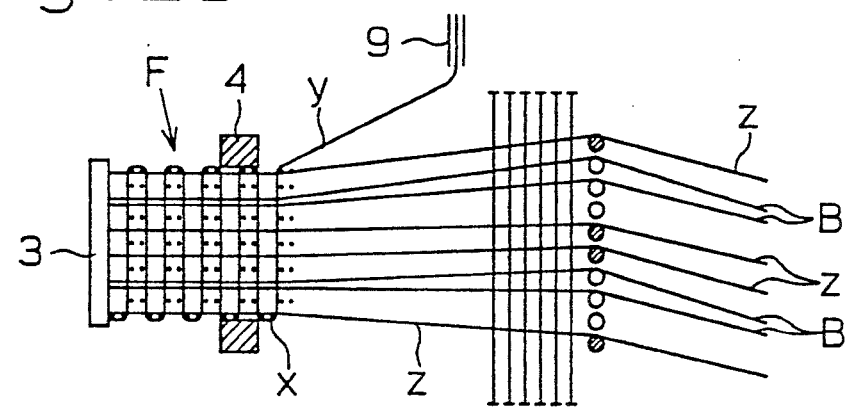

Subsequently, the vertical thread rapier 9 is moved to the lifted position so that the vertical thread y is folded back upwardly. Then, the warp shedding devices 5 and the bias thread shedding devices 6 are disposed successively to their lowered positions from the side remote from the cloth fell frame 4 to form a shed, and insertion of the weft x into the shed by the weft rapier 17. When the vertical thread rapier 9 is moved to the lifted positon, an upwardly directed portion of the vertical thread y extending from the vertical thread rapier 9 to the cloth fell is disposed obliquely with respect to the cloth fell as shown in FIG. 19. As beating is performed simultaneously with insertion of the weft x by the weft rapier 17, the upwardly directed portion of the vertical thread y is successively disposed into a parallel condition to the cloth fell as shown in FIG. 20. After a condition shown in FIG. 21 is entered as a result of completion of insertion of the weft x into all of the stages, the yarn supporting plate 3 is moved so that the three dimensional fabric F is moved by one pitch until an end portion thereof is put into a condition shown in FIG. 16. Thereafter, a similar sequence of operations are repeated so that the three dimensional fabric F having the substantially same structure as the three dimensional fabric shown in FIG. 1 is woven. The difference from the three dimensional fabric F shown in FIG. 1 resides in that the number of rows of the warp strings z is greater by one.

EMBODIMENT 2

A second embodiment will be described with reference to FIGS. 22 to 27. In a three dimensional fabric F of the present embodiment, a weft x is inserted not only into a loop portion at a folded end of a vertical thread y inserted in a folded condition between adjacent columns of warp strings z but also between each warp z and bias thread B so that the density of the wefts x is increased.

When a three dimensional fabric F of the type mentioned is to be woven, movement of bias thread B is performed in a similar manner as in the preceding embodiment. That is, in a condition wherein the vertical thread rapier 9 is disposed at the lifted position while the warp shedding devices 5 and the bias thread shedding devices 6 are disposed at the respective lowered positions.

Figure 24:
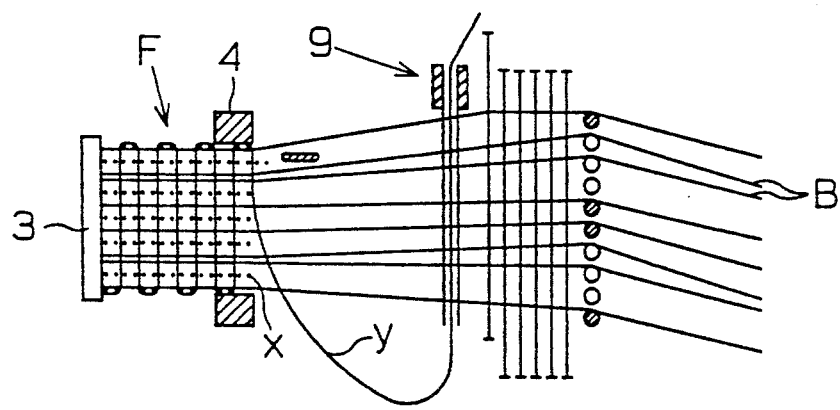
Figure 25:
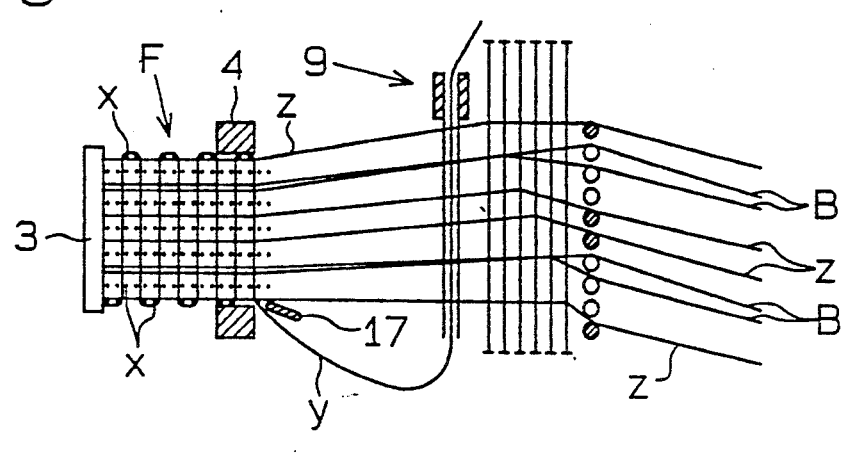

Subsequently, the vertical thread rapier 9 is inserted, and thereafter, the warp shedding devices 5 and the bias thread shedding devices 6 are successively operated to the respective lifted positions from the cloth fell frame 4 side so that sheds of the warp strings z and the bias thread B are formed successively from above while insertion of the weft x is performed into the sheds by the weft rapier 17 as shown in FIG. 24. Then, after insertion of the weft x into the shed at the lowermost stage is completed as shown in FIG. 25, the vertical thread rapier 9 is moved to the lifted position 9 so that the vertical threads y are folded back.

Figure 23:
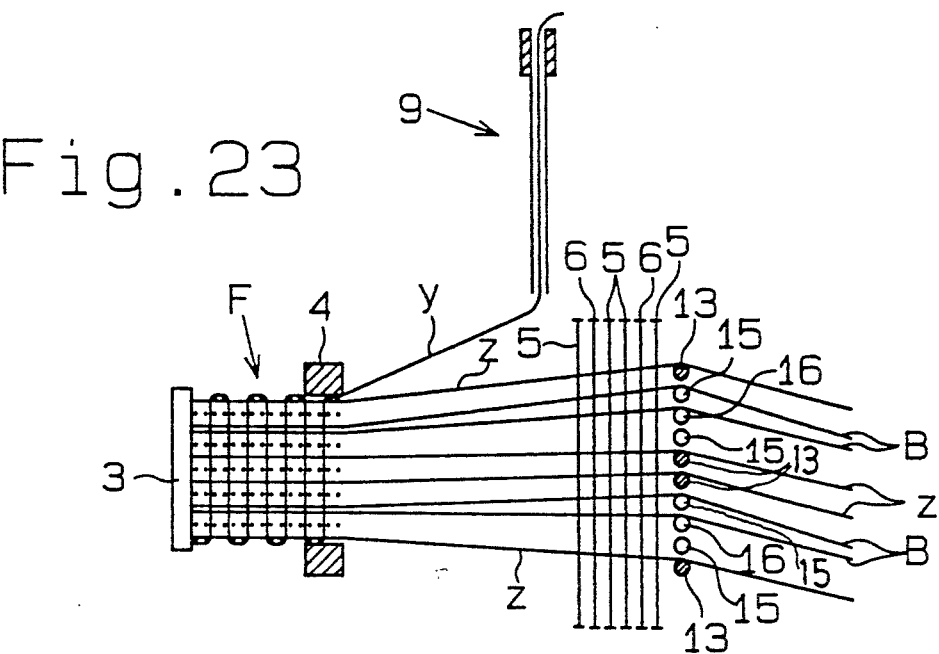
Figure 26:
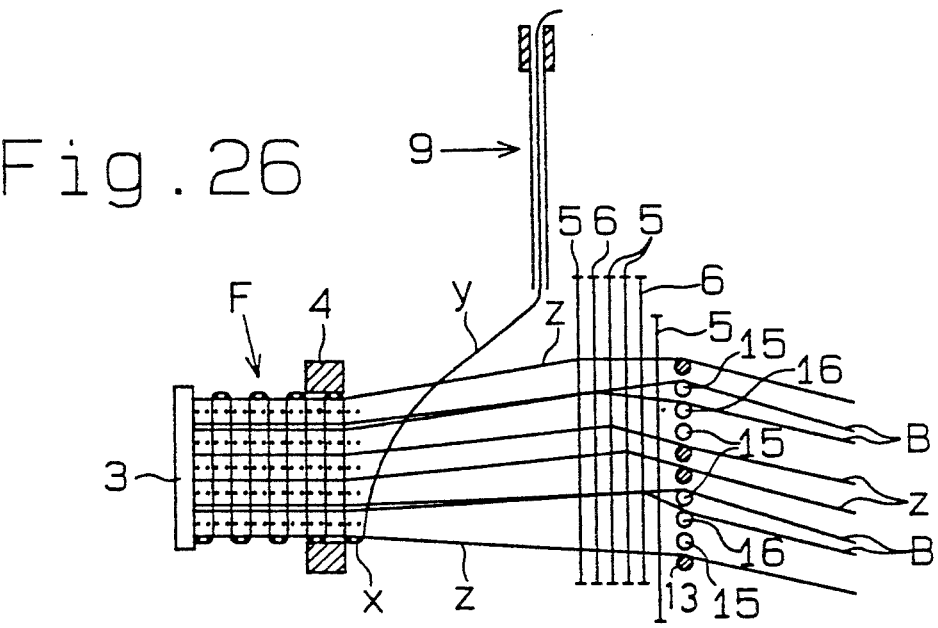
Figure 27:
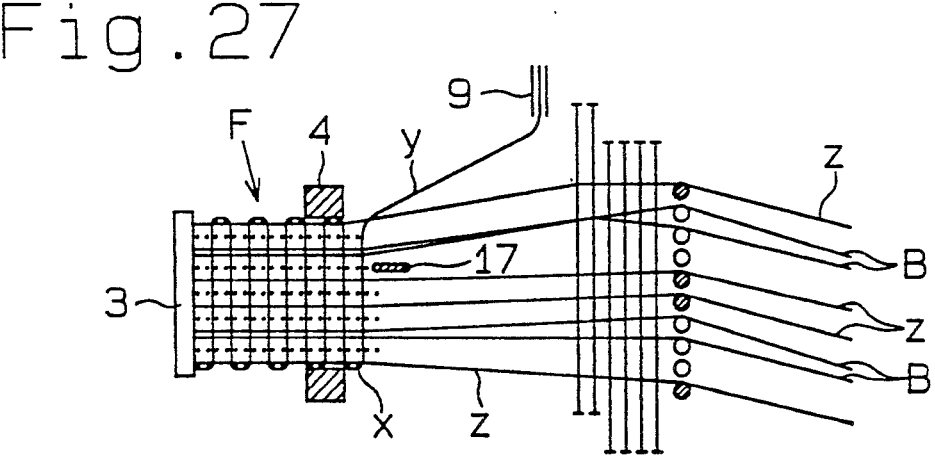

Subsequently, the yarn supporting plate 3 is moved so that the three dimensional fabric F is drawn up, and then the warp shedding devices 5 and the bias thread shedding devices 6 are operated in a similar manner as in the preceding embodiment. Thus, sheds of the warp strings z and the bias threads B are formed successively from below while insertion of the weft x by the weft rapier 17 is performed as shown in FIGS. 26 and 27. After completion of insertion of the weft x for all of the stages, the yarn supporting plate 3 is drawn up by one pitch so that a condition similar to that shown in FIG. 23 is entered. A similar sequence of operations are thereafter repeated so that weaving of the three dimensional fabric F proceeds.

Figure 28:
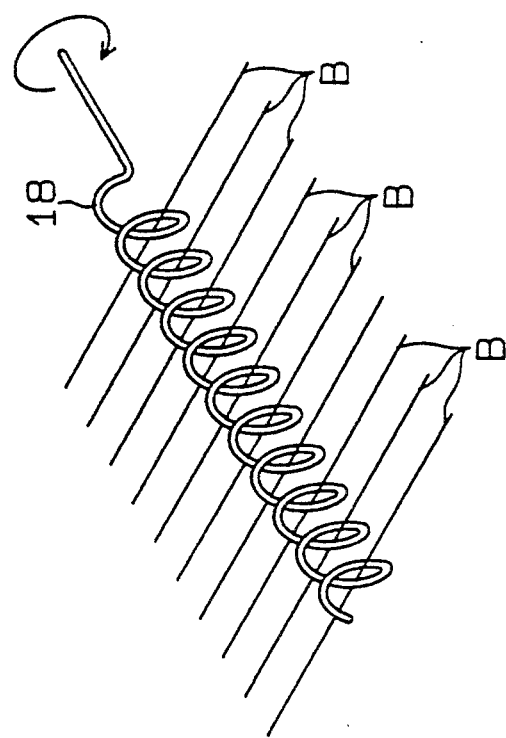
FIGS. 28 and 29 are schematic perspective views of essential parts of a thread feeding device of a modified example.
Figure 29:
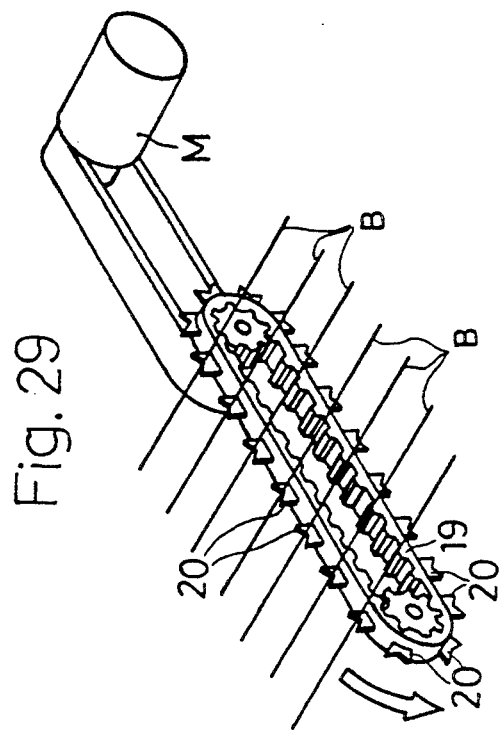
Figure 22:
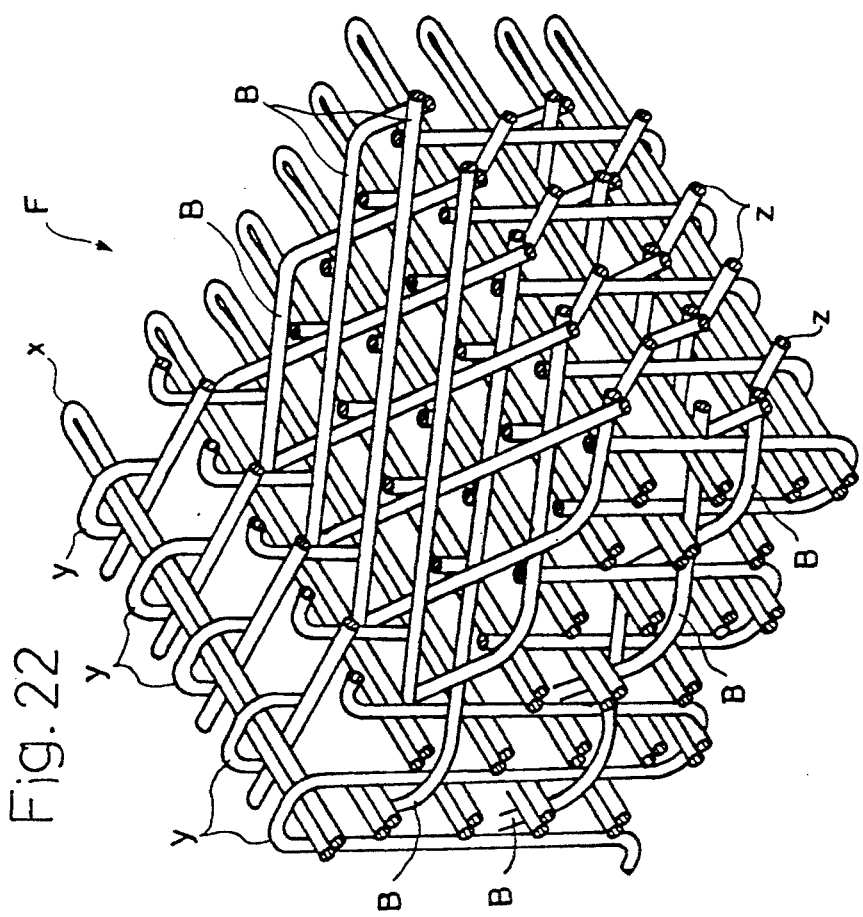
FIGS. 22 to 27 show a second embodiment.

Each of the screw shafts 15 and 16 of the bias thread feeding device 14 of the two embodiments described above may be replaced by another structure employing a rod 18 formed in a spiral shape as shown in FIG. 28. The screw shafts 15, 16 may be, alternately, substituted by the structure employing a device wherein yarn guides 20 for engagement with bias threads B project predetermined distances from an outer peripheral face of a belt 19 driven by a motor M as shown in FIG. 29. In this modification, the bias threads B may be successively moved by a predetermined pitch by movement of the belt 19. Meanwhile, the numbers of layers of the warp strings z and layers of the bias threads B and the positional relationship between them may be modified arbitrarily so long as at least one layer of warp strings z and one set of bias threads B are present. Further, in place of the provision of the tension adjusting devices 12 between the guide plate 11 and the bias thread beams 2a corresponding to the individual bias threads B, a structure may be employed wherein bias threads B are individually drawn out from mutually independent bobbins and variations in thread tension which take place in the bias threads B in response to operation of the bias thread feeding device 14 are absorbed by rotation of the bobbins, or the vertical threads y and the wefts x may be inserted using shuttles.

EMBODIMENT 3

A third embodiment will be described with reference to FIGS. 30 to 33. A three dimensional fabric F of the present embodiment has a similar structure to that of the three dimensional fabric F of the first embodiment except for the difference in arrangement and structure of bias thread layers. In particular, bias threads B of one of two sets of bias thread layers (the set disposed at the lower stage) are disposed such that they are folded back at the opposite end portions in a widthwise direction of the three dimensional fabric F in a similar manner as in the first embodiment while bias threads B of the other set are disposed such that they are folded back intermediately of the width of the three dimensional fabric F. A portion at which the bias threads B are disposed makes a 5-axis three dimensional fabric wherein an in-plane 4-axis fabric is coupled by the vertical threads y, but the other portion at which the bias threads B are not disposed makes a 3-axis (only X, Y and Z) fabric, rather than a 5-axis fabric. Further, a portion of the three dimensional fabric F at which no bias thread is present because the bias threads B are folded back intermediately has a thickness smaller by a distance corresponding to thickness of two layers of the bias threads B.

The three dimensional fabric F is used as a composite material wherein it is impregnated with a resin or the like, and due to the presence of the bias threads B disposed in inclined directions with respect to the longitudinal direction of the fabric. The amount of deformation by a force acting in an oblique direction is reduced as compared to a composite material wherein a conventional 3-axis three dimensional fabric is employed as the core. Further, a portion having a comparatively great number of layers of the bias threads B is greater in thickness and is particularly high in strength. While the fabric of FIG. 30 includes the warp strings z of four columns and three rows and two sets of layers of the bias threads B, the number of the layers of the warp strings z and the bias threads B or the folded positions of the bias threads B are determined depending upon a size and required physical properties of a composite material in which the three dimensional fabric is employed as a skeletal material. A multiplicity of sets of bias thread layers may be disposed while the folded positions of the bias threads B of the individual sets are successively displaced so that the entire three dimensional fabric may have a gradual variation in thickness in its widthwise direction.

Figure 30:
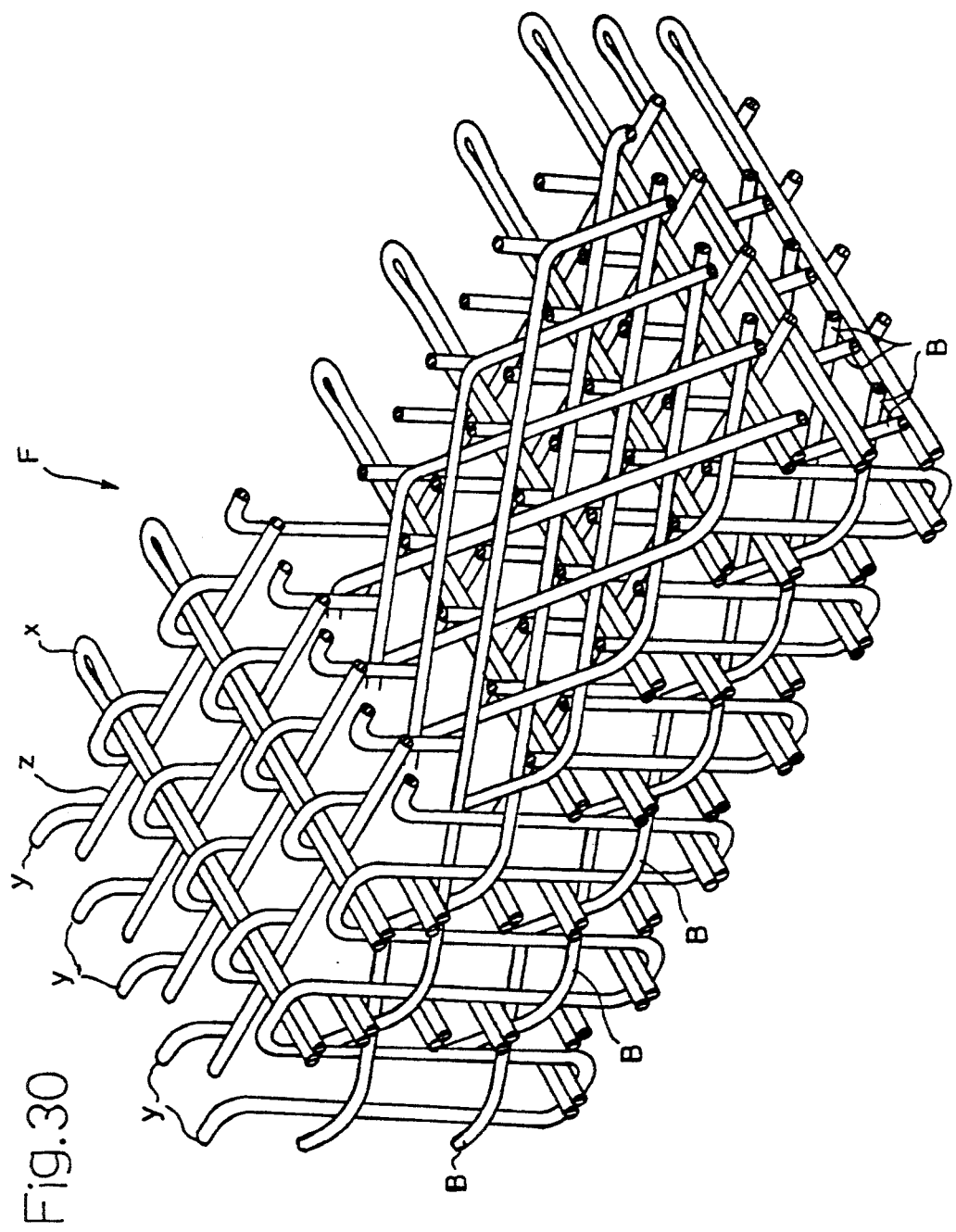
FIGS. 30 to 33 show a third embodiment.
Figure 31:
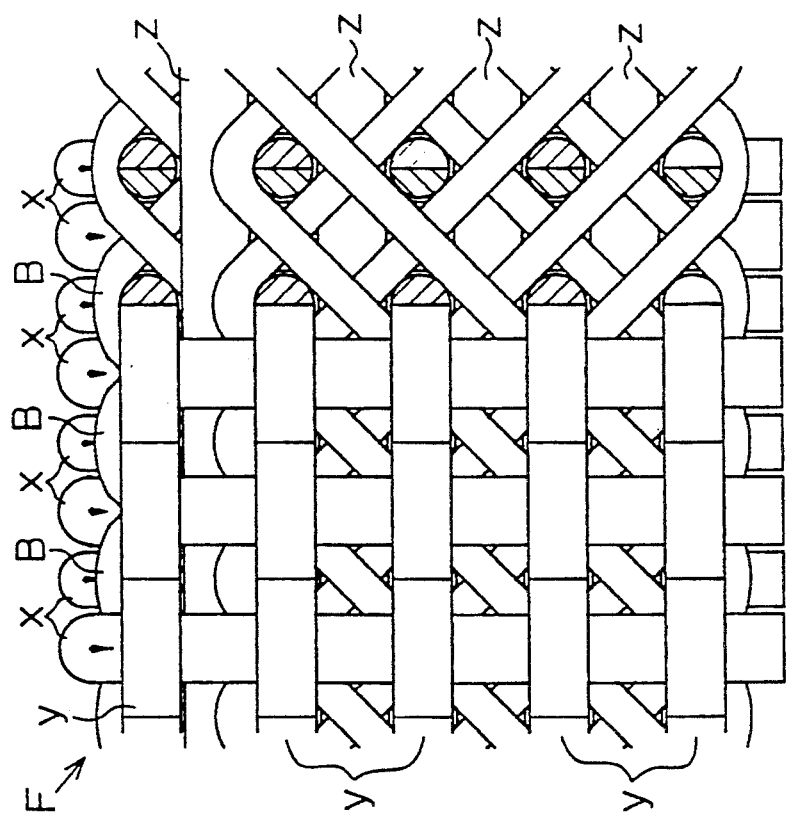

The three dimensional fabric F of this type is woven in a substantially similar manner as in the case of the first embodiment. Since the folding width of the bias threads B are different for different bias thread layers, the setting condition of the bias threads B upon starting of weaving is different. The number of bias threads B of one set is required to be twice as much as the number of vertical threads y to be inserted in the width within which the set of the bias thread layer is folded back. Since the number of vertical threads y of the three dimensional fabric F shown in FIGS. 30 and 31 is 5, the number of bias threads B constituting insertion of bias threads B to be folded back over the full width must be 10.

Figure 32:
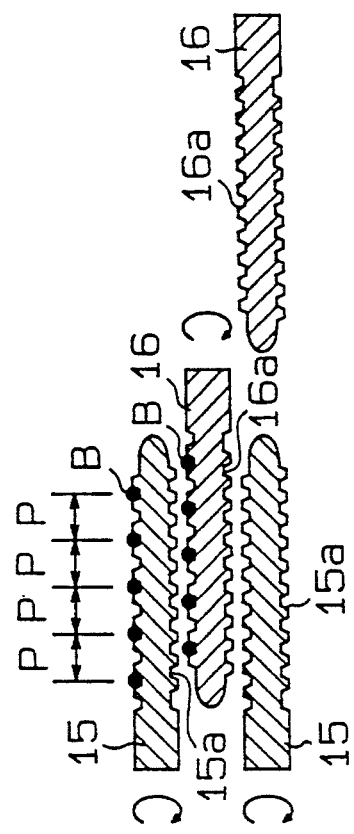
Figure 33:
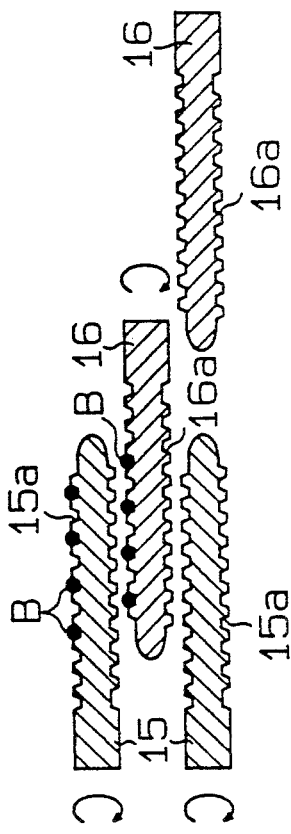

The bias threads B are set in position on the screw shafts 15 and 16 in the manner shown in FIG. 32. Further, since the number of bias threads B to be folded back with a smaller width than the full width is required to be 8 because they correspond to four vertical threads y, they are set in position to the screw shafts 15 and 16 which are set such that they overlap in a smaller extent with each other as shown in FIG. 33. From this condition, weaving is performed in a manner to that described above so that the three dimensional fabric F is woven.

EMBODIMENT 4

Figure 34:
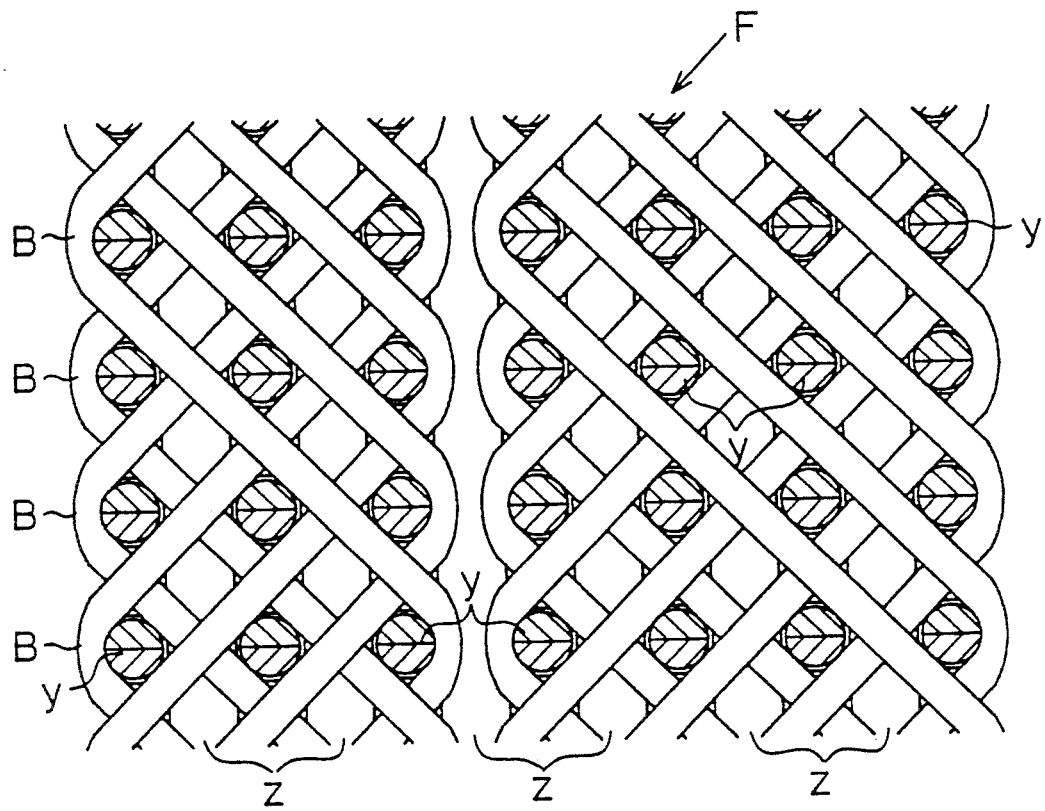
FIGS. 34 and 35 show a fourth embodiment.
Figure 35:
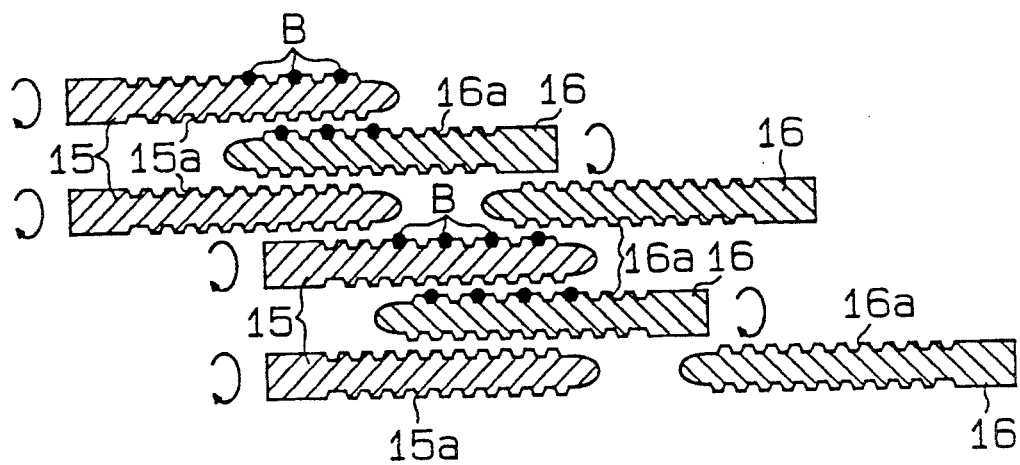

The fourth embodiment will be described with reference to FIGS. 34 and 35. A three dimensional fabric F of the present embodiment is significantly different from the three dimensional fabrics F of the preceding embodiments. In this embodiment, bias threads B constituting individual bias thread layers are individually folded back at same positions intermediate of a weaving width of the three dimensional fabric F. The bias threads are disposed also at the remaining portions outside the folded position of the bias threads B. As shown in FIG. 34, layers of the bias threads B are constituted from different groups of the bias threads B on the righthand side portion and the left-hand side portion of the three dimensional fabric F. The bias threads B of the individual groups are folded back at mutually adjacent positions to each other. Accordingly, with the present three dimensional fabric F, a tightening force of the bias threads B is exhibited also at a central portion in addition to the opposite side edge portions of the fabric F. The fiber density in the inside of the three dimensional fabric F is increased and also the strength at such portion is improved comparing with the case wherein the same bias thread layer is constituted from a set of bias threads B.

When the bias threads B are to be disposed on the remaining portion outside the folded position of the bias threads B in the present three dimensional fabric F as follows. Two sets of bias thread feeding devices 14 are required in order to constitute same bias thread layers as shown in FIG. 35, and the bias threads B are moved independently for each bias thread group.

In this embodiment, the folded position of the bias thread layer may be displaced in a widthwise direction of the three dimensional fabric F. In this structure, a portion where no bias thread is inserted may be provided at a mid location of the three dimensional fabric F.

In case the folded position of a bias thread layer is displaced for each group of the bias thread layers and besides bias threads are disposed over the full width, an action of the bias threads B to tighten the three dimensional fabric F in the widthwise directions is distributed in the widthwise directions by way of the vertical threads y, and the three dimensional fabric F obtained has a uniform fiber density. Further, a weft x may be inserted not only into a loop portion at a folded end of a vertical thread y inserted in a folded condition between adjacent columns of warp strings z but also between each warp z and bias thread B. This increases the density of the wefts x as in the three dimensional fabric F of the second embodiment. Alternatively, warp strings z may be displaced at a remaining portion of a folded layer of bias threads B in place of bias threads.

EMBODIMENT 5

Figure 37:
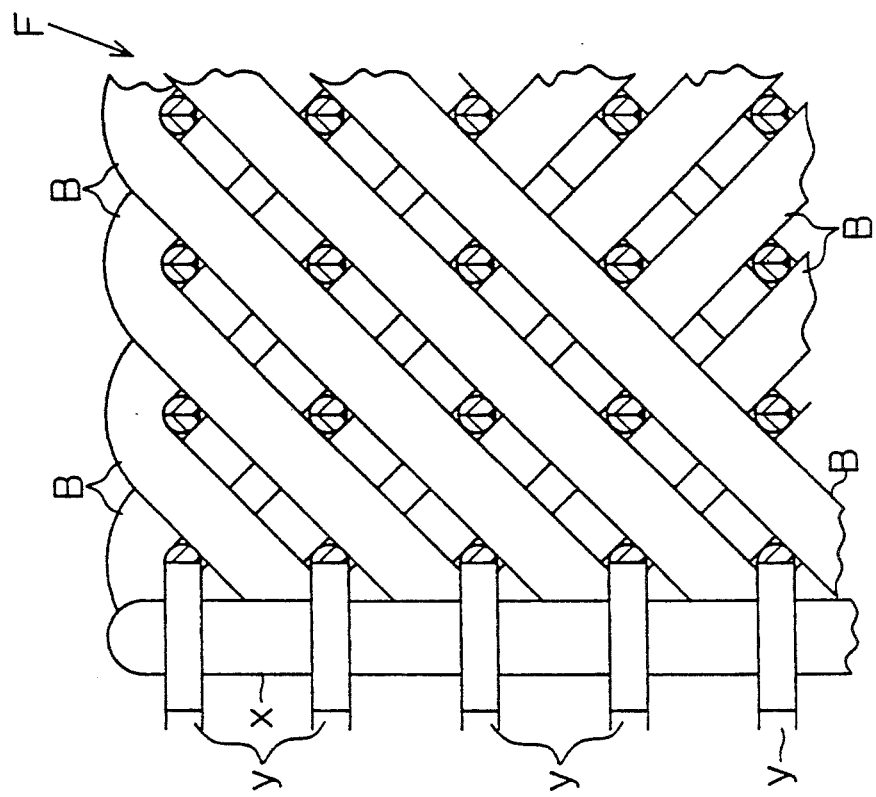
FIGS. 36 to 41 show a fifth embodiment.
Figure 36:
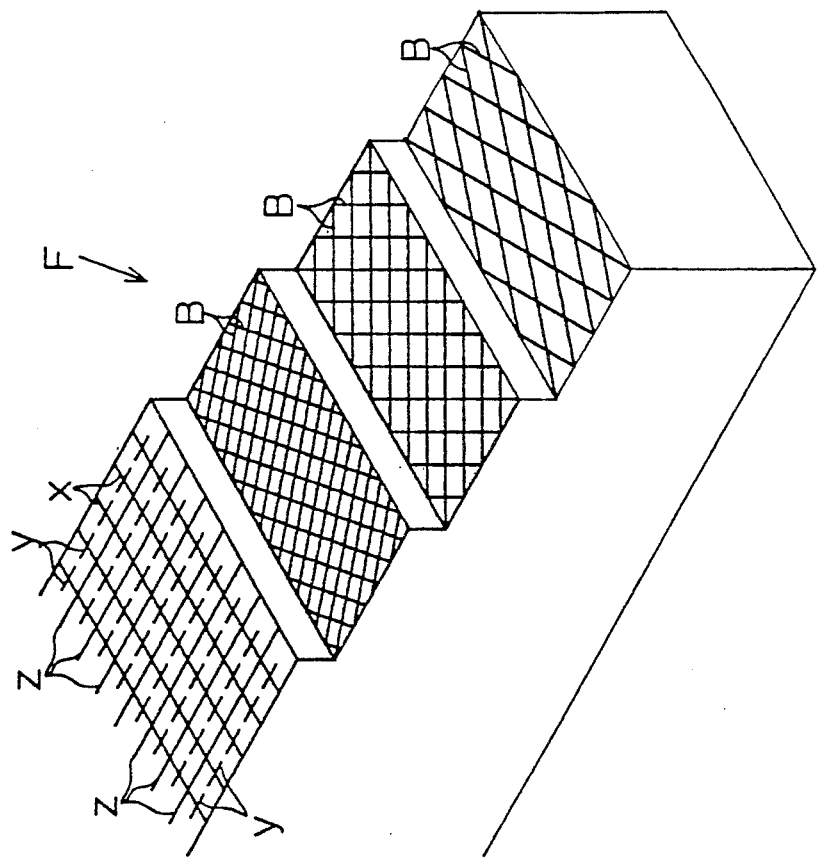
Figure 38:
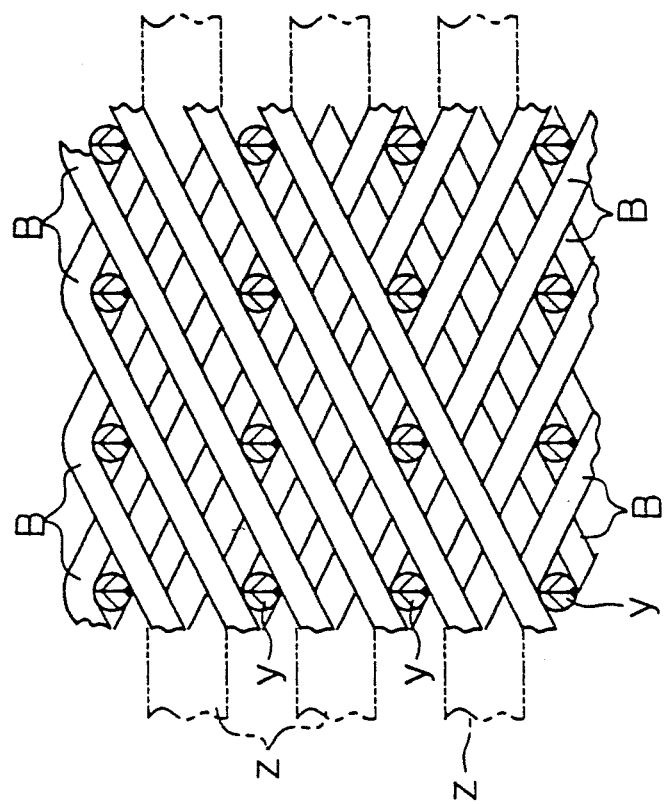
Figure 39:
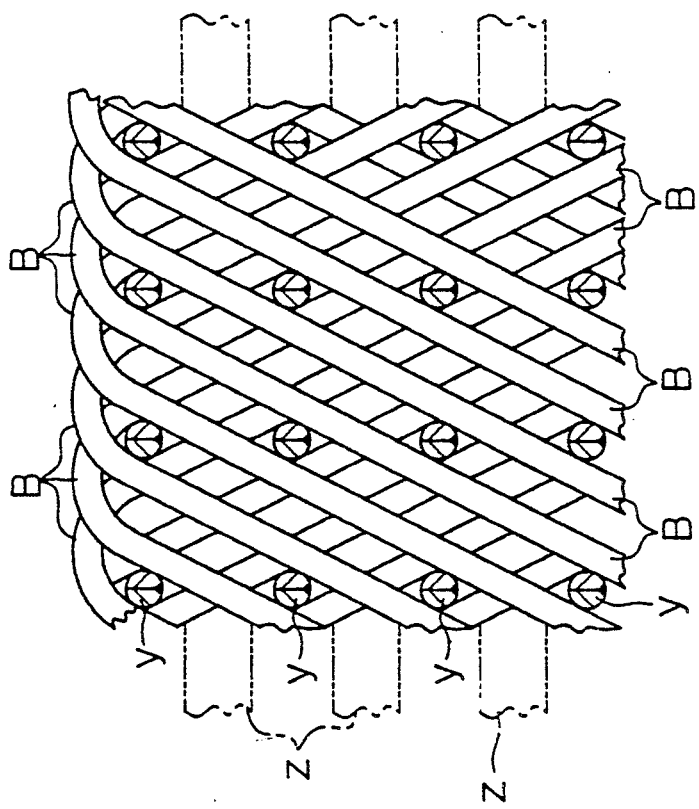

The fifth embodiment will be described with reference to FIGS. 36 to 41. A three dimensional fabric F of the present embodiment is different in arrangement and structure of bias thread layers from any of the three dimensional fabrics F of the preceding embodiments. Bias threads B provided in a plurality of sets each including two layers are all folded back at end portions in widthwise directions of the three dimensional fabric F, and an upper bias thread layer and a lower bias thread layer are formed from continuous bias threads B. The bias threads B in the upper layer and the lower layer are arranged such that they are inclined symmetrically with respect to each other. Meanwhile, bias thread layers of one set of two layers are cyclically inverted in their direction of inclination. The inclination angles defined between the warp strings z and the bias threads B constituting the bias thread layers of a plurality of sets are not equal among all of the sets. Three kinds of sets are present in this embodiment. One type of set has an inclination angle is 45 degrees as shown in FIG. 37, the second as an inclination angle is 60 degrees as shown in FIG. 38 and the third has an inclination angle is 30 degrees as shown in FIG. 39. Thus, an in-plane 8-axis fabric is constituted from the wefts x having an inclination angle corresponding to 90 degrees, the bias threads B and the warp strings z.

The three dimensional fabric F includes, in addition to the warp strings z, wefts x and vertical threads y, a plurality of sets of bias threads with each set constituted from two layers which are arranged such that they may be inclined symmetrically to each other with respect the longitudinal direction of the fabric in a plane parallel to the layers of the warp strings. The inclination angle of the bias thread layers of at least one set is different from the inclination angles of the bias thread layers of the other sets. Thus, it has improved in-plane uniformly when compared to an in-plane 4-axis, totally 5-axis three dimensional fabric,. When a three dimensional fabric F is used as a core of a composite material which employs a resin or the like as a matrix, the amount of deformation by a force acting in an oblique direction upon the composite material is further reduced by an action of the bias threads. Consequently, the fabric has a wide range of application as a structural member. Because the bias thread layers within one set are formed by a multiplicity of bias threads B folded back continuously, the composite material has good rigidity against a tensile load, a bending load and some other loads and is thus improved in strength.

An apparatus for weaving the three dimensional fabric is basically the same as that of the first embodiment except for the numbers of the bias thread beams $2a$ and of sets and so forth of the screw shafts 15 and 16 constituting the bias thread feeding device 14 are greater corresponding to the number of sets of bias thread layers.

Figure 40:
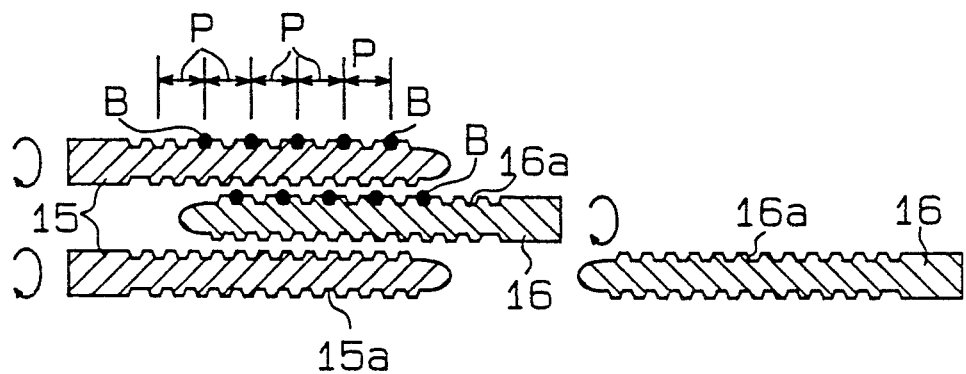

An outline of a weaving procedure will be described hereinafter. The number of bias threads B in each set varies in accordance with the inclination angle of the bias threads B relative to the longitudinal direction of the fabric. The numbers of bias threads B in each set when the angle of inclination is either 45 degrees or 60 degrees is given by the formula $\{2(n-1)+2\}$. Wherein the number of vertical threads y inserted in a width within which the set of the bias thread layer is folded back is represented by n. Since the number of the vertical threads y of the three dimensional fabric F of the present embodiment is 5, up to 10 bias threads B are required and are set in position on the screw shafts 15 and 16 as shown in FIG. 40.

Figure 41:
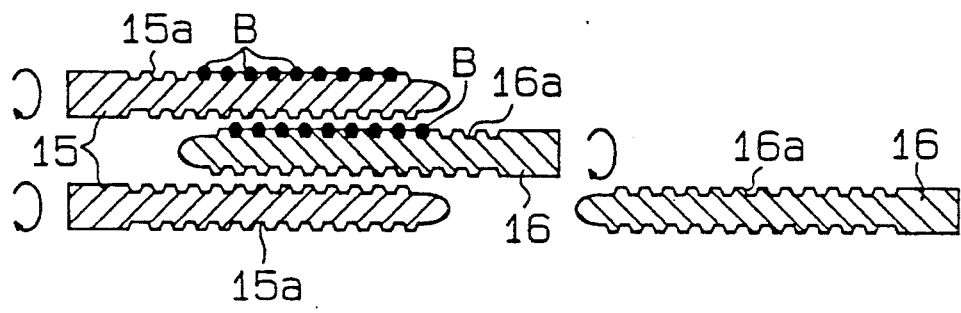

The number of bias threads B required when the inclination angle is 30 degrees is given by the formula $\{4(n-1)+2\}$, wherein the number of vertical threads y to be inserted in a width within which the set of the bias thread layer is folded back is represented by n. Since the number of the vertical threads y is 5, up to 18 bias threads B are required and set in position on the screw shafts 15 and 16 as shown in FIG. 41.

Then, in the bias thread feeding device 14 for moving the bias threads B such the inclination angles thereof with respect to the longitudinal direction of the fabric, that is, to the longitudinal direction of the warp strings z, may be 45 degrees, the screw shafts 15 and 16 are driven so that the individual bias threads B may be moved by one pitch by one feeding operation similarly as in the first embodiment. Meanwhile, in the bias thread feeding device 14 for moving the bias threads B such that the inclination angles thereof may be 60 degrees, the screw shafts 15 and 16 are driven so that the individual bias threads B may be moved by two pitches in one feeding operation. In other words, where the inclination angle of the bias threads B is 60 degrees, the screw shafts 15 and 16 are rotated twice that of the case wherein the inclination angle is 45 degrees.

On the other hand, when the bias threads B are to be moved such that the inclination angle may be 30 degrees, the bias thread feeding device 14 rotates, by a single feeding operation, the screw shafts 15 and 16 by one half that of the case wherein the inclination angle is 45 degrees so that the individual bias threads B may be moved by a half pitch. However, in a condition after the bias threads B are moved by a half pitch, they are disposed between the warp strings z and will interfere with insertion of the vertical threads y, and accordingly, the bias thread feeding device 14 for moving the bias threads B which are arranged at an inclination angle of 30 degrees is driven not so that the bias threads B may be moved by a half pitch for each insertion of the vertical threads y but so that the bias threads B may be moved by one pitch for each two times of insertion of the vertical threads y. As a result, the bias threads are arranged in a similar manner as in the case wherein they are moved by a half pitch for each time of insertion of the vertical threads y as shown in FIG. 39. It is to be noted that, when the bias thread feeding device 14 is operated in such a manner as described above, the bias threads B are arranged at such an inclination angle as described above in case the warp strings z and the wefts x have the same thickness and are arranged in the same pitch. In this instance, where a thin thread comparing with the warp strings z, the wefts x and the bias threads B which are arranged at the inclination angle of 45 degrees is employed for the bias threads B which are arranged at the inclination angles of 30 degrees and 60 degrees, the snaking of the threads is reduced and the fiber charging rate can be increased.

EMBODIMENT 6

The sixth embodiment will be described with reference to FIG. 42. In this embodiment, the vertical thread rapier 9 employs a structure wherein, as shown in FIG. 42, pipes 9a are mounted in front and rear rows on a support body 10 such that vertical threads y are threaded alternatively through the front and rear pipes 9a.

In the preceding embodiments, the vertical threads y are inserted at a time between the warp strings z and the bias threads B by way of the pipes 9a arranged in a row. In such structure, the distance between the warp strings z and the bias threads B is so small that it is necessary for the pipes 9a to push aside and advance between the warp strings z and the bias threads B in lateral directions. Therefore, there is a fear the warp strings z and the bias threads B cannot escape in lateral directions and the pipes 9a may rub against the warp strings z and the bias threads B to damage the warp strings z and the bias threads B. However, where such structure is employed, since the warp strings z and the bias threads B can escape when they are acted upon by laterally acting forces from the pipes 9a, the pipes 9a do not rub strongly against the threads. The pipes 9a may be arranged in three or more rows while the warp strings y may be inserted at a distance or every two or more pipes a. Further, the vertical thread rapier may be divided into a plurality of groups for which an insertion timing is displaced or into which the wefts may be inserted from the opposite front and rear face sides of the three dimensional fabric.

Alternatively, as the vertical thread rapier 9, a structure may be employed wherein a plate-formed member having guide holes formed at an end thereof is secured to the support body 10 in place of the pipes.

EMBODIMENT 7

A seventh embodiment will be described with reference to FIGS. 43 to 60. As shown in FIGS. 43 and 44, a three dimensional fabric F of this embodiment is composed of a warp thread layer including a multiplicity of warp strings z. The warp strings are arranged in a plurality of columns and a plurality of rows (four columns and two rows in FIG. 43) which extend parallel to a longitudinal direction of the three dimensional fabric F. A bias thread layer having a multiplicity of continuous bias threads B are disposed in an inclined relationship with respect to the longitudinal direction of the fabric in a plane parallel to the warp thread layer. A plurality of vertical threads y are disposed in a thicknesswise direction of the fabric such that they perpendicularly intersect the warp strings z between and on the opposite outer sides of the individual columns of the warp layer and continuous for individual columns. In other words, in contrast to the three dimensional fabric F of the preceding embodiments, the three dimensional fabric F of the present embodiment includes no weft x and is formed as a 4-axis three dimensional fabric. The bias threads B are folded back at end portions in the widthwise direction of the three dimensional fabric F such that each two layers may make one set, and the upper bias thread layer and the lower bias thread layer are constituted from the continuous bias threads B while each of the layers has an inclination of one direction and the bias threads B of the upper and lower layers are disposed such that they may be inclined symmetrically to each other. Each of the vertical threads y is inserted from above the three dimensional fabric F in a folded condition forming a loop at an end thereof. A selvage thread S is inserted in the end loop portion of the vertical thread y in order to attempt to prevent coming off of the end loop. Also the selvage thread S is inserted in a folded condition forming a loop at an end thereof. It is to be noted that, while the warp strings z, vertical threads y and bias threads B are shown in a spaced relationship from each other in FIG. 43 in order to make the structure clear, actually the threads are held in a closely contacting relationship with each other as shown in FIG. 44. Further, where a fiber bundle roving which has little twist like carbon fiber is employed for the threads, the selvage threads S and the vertical threads y which are inserted in a folded condition forming loops at ends thereof are overlapped, after weaving, with each other so that they are individually integrated with each other as shown in FIG. 44.

In the three dimensional fabric F, in-plane isotropy of in-plane 3-axes is obtained by the warp strings z and the bias threads B which are arranged such that they are inclined symmetrically to each other, and the structure is simplified compared to an in-plane 4-axis, totally 5-axis three dimensional fabric. Consequently, it is easy to make the bias threads thick, and the fiber orientation ratio of the bias threads can be raised. Then, if the bias threads are made thick comparing with those of an in-plane 4-axis, totally 5-axis three dimensional fabric, where the three dimensional fabric is used as a composite material in which a resin or the like is impregnated, the composite material obtained is improved in strength in oblique directions and is tough against shearing compression in the longitudinal direction.

Figure 46:
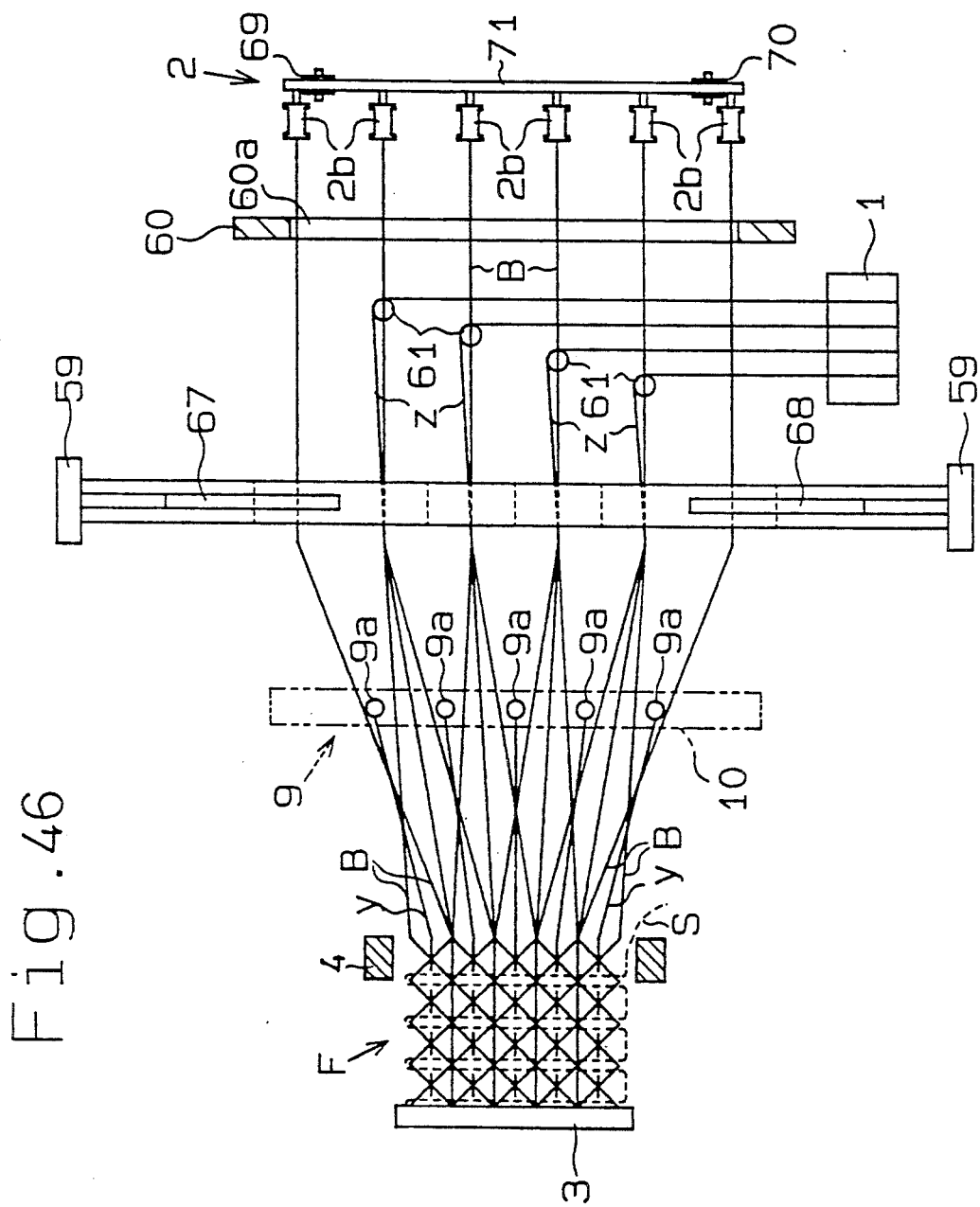

A process of producing the three dimensional fabric F described above will now be described. An apparatus for weaving the three dimensional fabric includes, as shown in FIGS. 45 and 46, a warp supplying section and thread supplying section 2. The warp supplying section includes a number of warp beams 1 corresponding to the number of rows of the warp strings z. The bias thread supplying section 2 includes a number of bias thread bobbins 2b equal to the number of the bias threads B for supplying bias threads B each two of which make a set. This apparatus also includes a yarn supporting plate 3 to which end portions of a multiplicity of warp strings z drawn out from the warp beams 1 and end portions of a multiplicity of bias threads B drawn out from the bias thread bobbins 2b is moved. As weaving proceeds, in a direction to draw up the three dimensional fabric F (to the left in FIGS. 45 and 46) by an action of a driving mechanism (not shown) from a position adjacent to a cloth fell frame 4 disposed at a predetermined location. A vertical thread rapier 9 is disposed to the rear of the cloth fell frame 4 (to the right in FIGS. 45 and 46) and inserts, by upward and downward movement thereof, vertical threads y drawn out from a vertical thread supplying section 8 into the individual columns of the warp strings z. Further, a selvage thread S to be inserted into an end loop of each of the vertical threads y is inserted in a folded condition forming a loop at an end thereof by a selvage thread rapier 58 (shown in FIG. 59).

A frame 59 and a guide plate 60 are disposed between a lower position of the vertical thread rapier 9 and the bias thread supplying section 2. A pluarlity of elongated holes 60a are formed in the guide plate 60 for permitting lateral movement of the bias threads B. The number of elongated holes 60a corresponds to the number of sets of the bias threads B. A multiplicity of warp guide rollers 61 are disposed between the frame 59 and the guide plate 60. The number of guide rollers 61 corresponds to the number of stages which corresponding to the number of rows of the warp strings z. The support shafts of the guide rollers 61 extend in upward and downward directions while the warp guide rollers 61 are arranged, at each of the stages, by a number corresponding to the number of columns of the warp strings z. The warp beams 1 are arranged at locations to the side of the warp guide rollers 61 such that axes thereof may extend in parallel to the longitudinal direction of the three directional fabric F. The warp strings z are drawn out from the warp beams 1 in directions perpendicular to the longitudinal direction of the three dimensional fabric F. The then are diverted by 90 degrees by the guide rollers 61 such that they are directed toward the cloth fell side. They are then supplied to the cloth fell by way of guide holes 62a formed in a warp guide 62 secured to the frame 59 so that the warp strings z maybe guided one by one.

A bias thread feeding device 14 for moving the bias threads B of each layer is provided at a location of the frame 59 opposing to the bias thread supplying section 2. The bias thread feeding device 14 is shown in FIGS. 47 to 54. It includes a pair of upper and lower rails 63 and 64 secured to the frame 59 such that they extend in a widthwise direction of the fabric. Guide blocks 65 serve as engaging portions and accommodated at two upper and lower stages each by five between the two rails 63 and 64. As shown in FIG. 48, the rails 63 and 64 have guide grooves 63a and 64a formed therein in an opposing relationship to each other and extending in longitudinal directions thereof, and the guide blocks 65 can be slidably moved along the guide grooves 63a and 64a in an engaged condition with the guide grooves 63a and 64a. Each of the guide blocks 65 has an insertion hole 65a formed therein in which a bias thread B is to be threaded.

A pair of grooves 66 are formed in on opposite sides of the rails 63 and 64 and extend in longitudinal directions of the rails 63 and 64 (widthwise directions of the fabric). A pair of operating members 67 and 68 extend vertically perpendicular to the rails 63 and 64. The operating members are disposed within the grooves 66 such they are movable both vertically and in the longitudinal directions of the rails 63 and 64. The rails 63 and 64 are driven by an action of a driving device (not shown). Further, restricting members 63b and 64b for restricting movement of the guide blocks 65 by an amount greater than a necessary amount as shown in FIG. 47 project from the rails 63 adn 64, respectively.

A recessed portion 67a which can accommodate a central portion of a guide block 65 therein is formed at a location of the one operating member 67 corresponding to the guide block 65 at the lower stage when the operating member 67 is disposed at its standby position. Another recessed portion 68a which can accommodate a central portion of a guide block 65 therein is formed at a location of the other operating member 68 corresponding to the guide block 65 at the upper stage when the operating member 68 is disposed at its standby position. In particular, the guide blocks 65 disposed at the two upper and lower stages each by five guide blocks are disposed such that four of each are opposed to each other while the respective ends are displaced from each other. In order to prevent interference of the vertical thread rapier 9 with the warp strings z and the bias threads B when the vertical threads y are inserted, the insertion holes 65a of the upper and lower guide blocks 65 in each pair and the guide holes 62a formed in the warp guide 62 are positioned in the same line in the upward and downward directions. It is to be noted that the two operating members 67 and 68 are provided across a plurality of bias thread feeding devices 14 and the guide blocks 65 of the individual bias thread feeding devices 14 are operated in a synchronized condition.

A pair of sprocket wheels 69 and 70 are disposed at locations corresponding to each of the elongated holes 60a to the rear of the guide plate 60, and a chain 71 is stretched between the sprocket wheels 69 and 70 such that it extends in parallel to the rails 63 and 64. The chain 71 has support brackets 72 integrally formed at some of link plates thereof, and the bias thread bobbins 2b of the bias thread supplying section 2 are supported on support shafts 73 secured to the support brackets 72. When the sprocket wheels 69 and 70 are in a stopping condition, the bias thread boddins 2b are arranged one by one at locations corresponding to the opposite sides of the sprocket wheels 69 and 70 as shown in FIG. 55. The remaining bias thread bobbins 2b are disposed at upper and lower symmetrical locations spaced by an equal distance from each other. A guide piece 74 is secured to each of the support shafts 73 such that it extends to a location forwardly of a bias thread bobbin 2b. A guide hole 74a for guiding a bias thread B drawn out from a corresponding bias thread bobbin 2b is formed in the guide piece 74 such that it may be positioned on an extension line of an axis of the bias thread bobbin 2b. Then, the one sprocket wheel 69 is rotated intermittently in a fixed direction in synchronism with driving of the bias thread feeding device 14 by a motor not shown.

The weaving of a three dimensional fabric by an apparatus having the structure described above will be described next.

Figure 49:
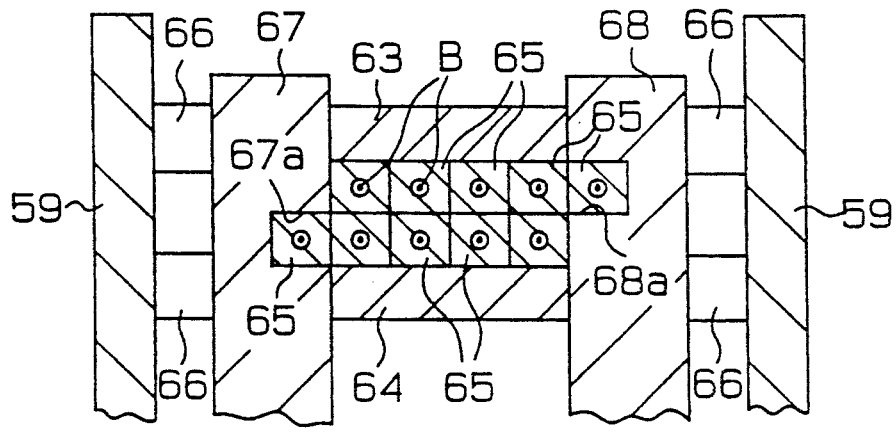
Figure 50:
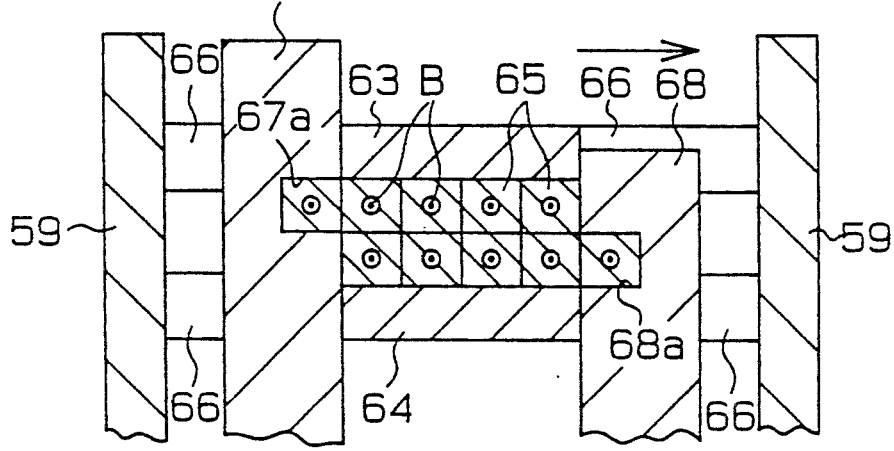
Figure 51:
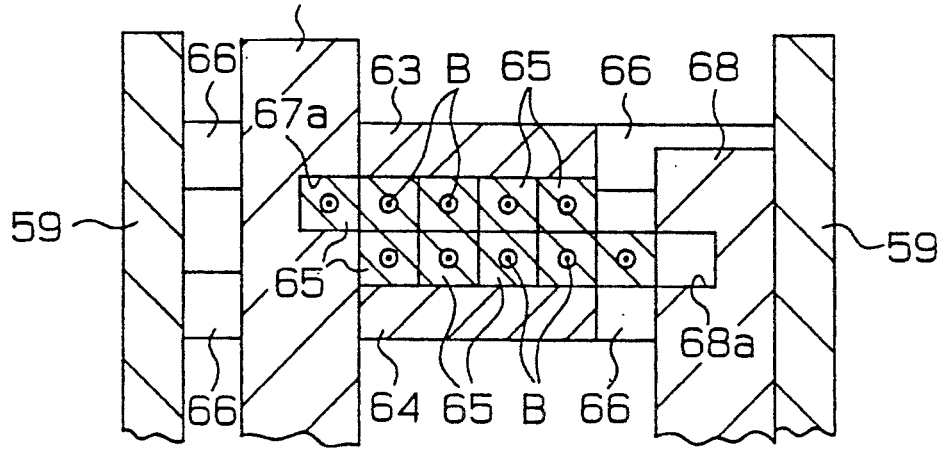

First, the feeding of the bias threads B by the bias thread feeding device 14 will be described. In FIG. 49, one of the guide blocks 65 at the lower stage is accommodated in the recessed portion 67a of the one operating member 67 while another one of the guide blocks 65 at the upper stage is accommodated in the recessed portion 68a of the other operating member 68. From this condition, if the first operating member 67 is moved upwardly while the second operating member 68 is moved downward each by a distance equal to the height of the guide blocks 75, then the guide blocks 65 which remain in engagement with the operating members 67 and 68 are moved integrally with the operating members 67 and 68 so that a condition shown in FIG. 50 is entered. Subsequently, the other support member 68 is moved outwardly (in the direction of an arrow mark in FIG. 50) so that the engagement between the recessed portion 68a thereof and the guide block 65 is canceled and a condition shown in FIG. 51 is entered. In this instance, since the guide block 65 which has been in engagement with the recessed portion 68a is restricted from movement by the restricting member 64b, the engagement between the recessed portion 68a and the guide block 65 is canceled with certainty by movement of the operating member 68. Thereafter, the support member 68 is moved upward again so that the condition of FIG. 52 is entered wherein the recessed portion 68a thereof corresponds to a guide block 65 at the upper stage.

From this condition, the first operating member 67 is moved outward and the second operating member 68 is moved inwardly in a mutually synchronized relationship. Consequently, the guide blocks 65 at the lower stage are moved leftward in FIG. 52 by a pressing force of the operating member 68 while the engagement between the guide block 65 disposed at an end at the upper stage and the recessed portion 67 of the operating member 67 is canceled so that the condition shown in FIG. 53 is entered. Subsequently, the operating member 67 is moved downward to a position at which the recessed portion 67a thereof corresponds to one of the guide blocks at the lower stage so that the condition shown in FIG. 54 is entered. From this condition, the operating member 67 is moved inward so that the guide blocks 65 at the upper state are moved to the right in FIG. 54 by a pressing force of the operating member 67. Then, the condition of FIG. 49 is restored wherein the guide block 65 disposed at the end at the upper stage is engaged with the recessed portion 68a of the operating member 68 and the guide block 65 disposed at the end at the lower stage is engaged with the recessed portion 67a of the operating member 67, thereby completing lateral movement of the bias threads B by one pitch. After then, the guide blocks 65 are moved circulatively in a predetermined direction along a loop-formed route of movement to successively perform lateral feeding operation of the bias threads B in a similar manner.

By the operation described above, the engaging portions between the bias threads B and the guide blocks 65 are moved from the lower layer side of the upper layer side at one end in the widthwise direction of the three dimensional fabric F (on the first operating member 67 side). Meanwhile, they are moved from the upper layer side to the lower layer side at the second end (on the second operating member 68 side). They are moved in the fixed directions opposite to each other at the upper layer and the lower layer, the bias threads B which constitute bias thread layers are put into a condition wherein each layer has an inclination of one direction.

The sprocket wheels 69 and 70 of the bias thread supplying section 2 are driven in synchronism with lateral feeding operation of the bias threads B by operation of the bias thread feeding device 14. The individual bias thread bobbins 2b are moved together with movement of the individual guide blocks 65. Accordingly, no twisting (crossing) will take place in routes of the individual bias threads B from the bias thread bobbins 2b to the cloth fell by way of the guide blocks 65.

Subsequently, a weaving procedure will be described. Upon starting of weaving of a three dimensional fabric F, the yarn supporting plate 3 is disposed at a position in the proximity of the cloth fell frame 4. The warp strings z drawn out from the warp beams 1 are set into a condition wherein they are threaded through the warp guide rollers 61 and the guide holes 62a of the warp guide 62 and are secured to the yarn supporting plate 3. The bias threads B drawn out from the bias thread bobbins 2b are threaded through the guide holes 74a, the elongated holes 60a and the bias thread feeding device 14 and are secured to the yarn supporting plate 3.

Figure 57:
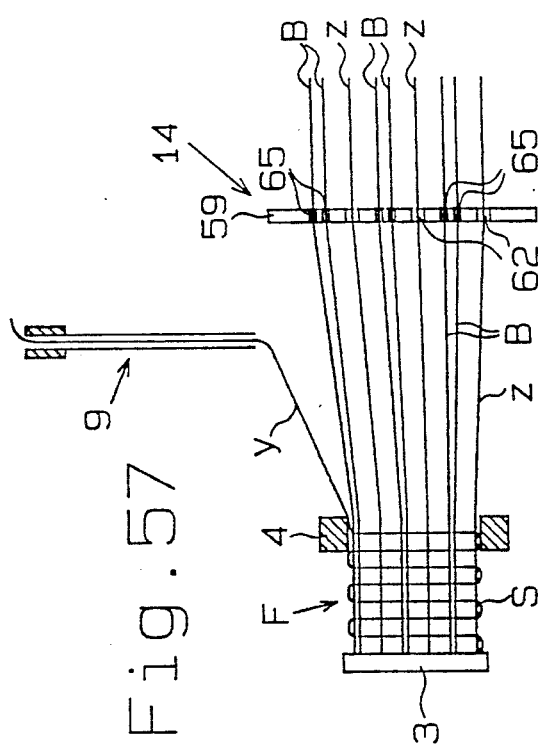
Figure 59:
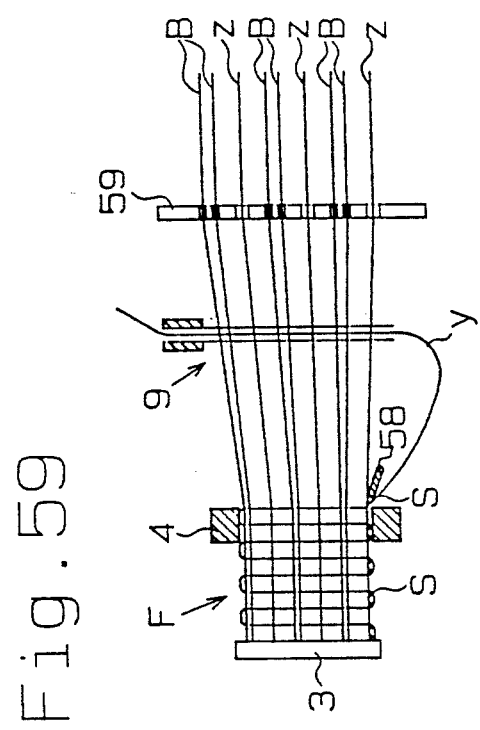

FIG. 57 shows a condition after insertion of the vertical threads y for the fourth layer of the three dimensional fabric F is completed, and in this condition, the vertical thread rapier 9 is disposed at its lifted position. In this condition, the bias thread feeding device 14 is driven as described hereinabove so that the individual bias threads B are moved by one pitch in widthwise directions of the three dimensional fabric.

Figure 58:
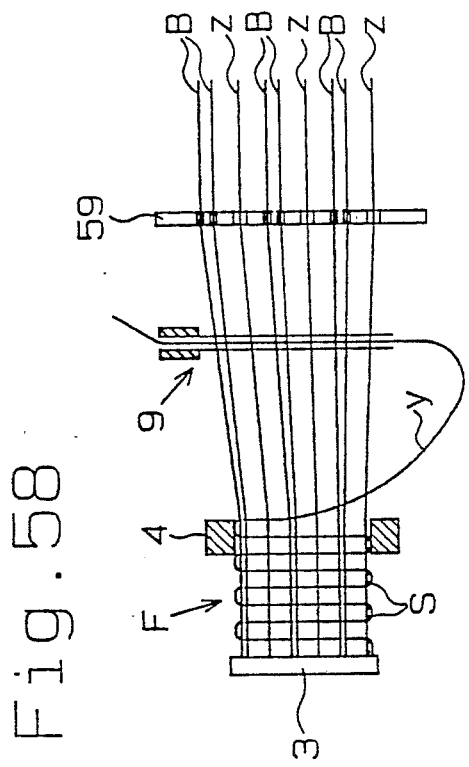

Subsequently, the vertical thread rapier 9 is moved downward so that the vertical threads y are inserted between and onto the opposite outer sides of the columns of the warp strings z as shown in FIG. 58. Thereupon, the individual pipes 9a of the vertical thread rapier 9 are inserted between the bias threads B behind intersecting portions of the bias threads B disposed in a mutually intersecting condition. That is, adjacent the bias thread feeding device 14 as shown in FIG. 46.

Figure 60:
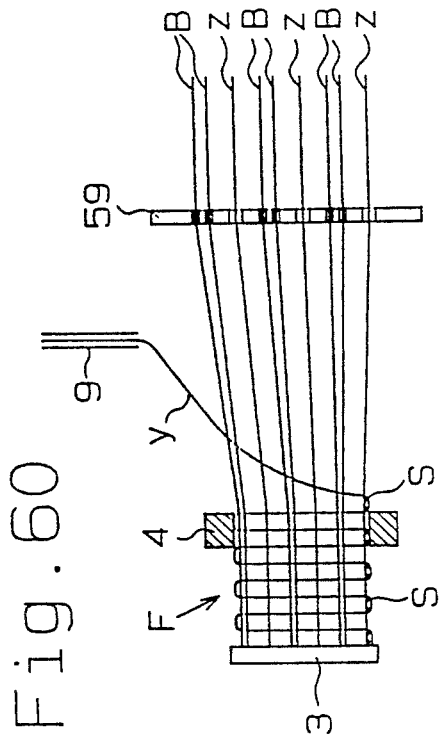

Subsequently, the selvage thread S is inserted into the end loops of the vertical threads y below the warp strings z at the lowermost stage by the selvage thread rapier 58. Since the selvage thread rapier 9 is spaced from the location of the cloth fell, the vertical threads 6 are not arranged in a perpendicularly intersecting condition to the warp strings z to the cloth fell position only by downward movement of the vertical thread rapier 9 and remain in a spaced condition from the cloth fell position. However, by insertion of the selvage thread S to the lowermost stage, the vertical threads y are arranged at the cloth fell position so that they may be put into a perpendicularly intersecting condition to the warp strings z. It is to be noted that, before insertion of the selvage thread S is performed, beating may be performed to move the vertical threads y to the cloth fell side in advance. The vertical thread rapier 9 is moved to its lifted position so that the vertical threads y are folded back upwardly. When the vertical thread rapier 9 is moved to the lifted position, the vertical threads y extending from the vertical thread rapier 9 to the cloth fell are disposed obliquely with respect to the cloth fell as shown in FIG. 60. However, a rod (not shown) which is disposed in parallel to the rows of the warp strings z above the warp strings z at the uppermost stage is moved to the cloth fell in a condition wherein it engages with the vertical threads y until the vertical threads y are disposed in parallel to the cloth fell. Then the thread supporting late 3 is moved so that the three dimensional fabric F is moved by one pitch until an end portion thereof is put into a condition shown in FIG. 57. Thereafter, a similar sequence of operations are repeated so that the three dimensional fabric F having a structure substantially the same as the three dimensional fabric F shown in FIGS. 43 and 44 is woven. The difference from the three dimensional fabric F shown in FIGS. 43 and 44 resides in that the number of rows of the warp strings z is greater by one and also in that the number of bias thread layers is greater by one set.

It is noted that, as a feeding method of the bias threads B, a method may be employed of successively moving the bias threads B using two sets of screw shafts described hereinabove in connection with the individual embodiments wherein the 5-axis three dimensional fabric F described above is woven. Further, the bias thread feeding device 14 and the bias thread supplying section 2 of the present embodiment may be applied to weaving of a 5-axis three dimensional fabric or the like which includes such wefts as described hereinabove.

Meanwhile, since twisting is applied upon releasing of the bias threads B with such releasing method of the bias theads B as illustrated in FIG. 56, the bias thread bobbins 2b may be mounted such that the axes thereof may extend perpendicularly to the thread drawing out direction. In this structure, the bias threads B may be drawn out in circumferential directions of the bias thread bobbins 2b.

EMBODIMENT 8

An eighth embodiment will be described with reference to FIGS. 61 to 64. This embodiment, is significantly different than the seventh embodiment in that a pair of vertical thread rapiers 9 are provided at front and rear locations. In this condition, vertical threads Y inserted into positions corresponding to spaces between and on the opposite outer sides of the warp layer columns are divided into two groups. As a result, mutual adjacent ones thereof may belong to different groups while inserting operation of the vertical threads Y of the two groups is formed alternately by the different vertical thread rapiers 9. In particular, one of the two vertical thread rapiers 9 includes two pipes 9a while the other vertical thread rapier 9 includes three pipes 9a. The two vertical thread rapiers 9 are operated alternately. Further, 6 bias thread sets B are used.

Figure 62:
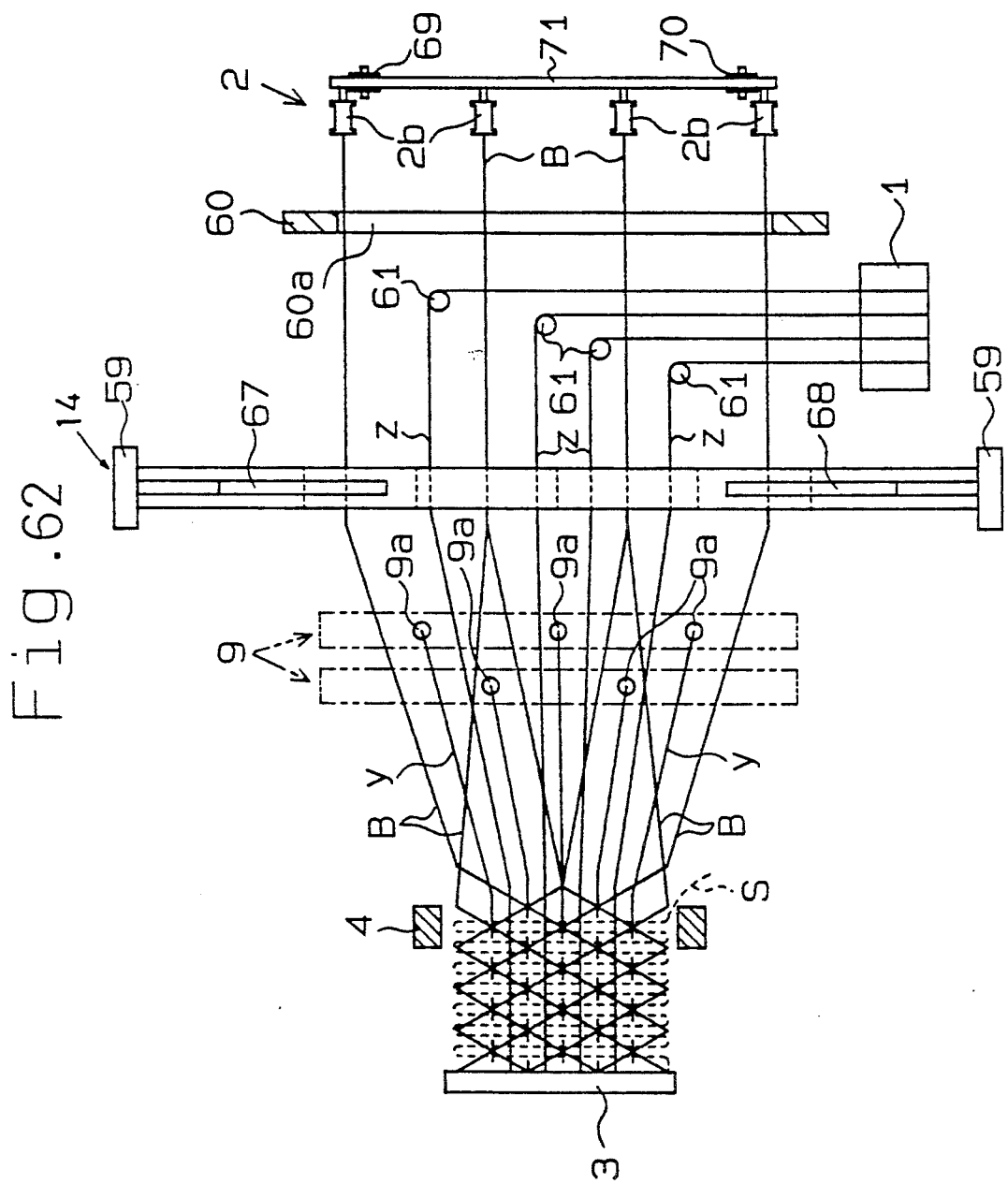

FIGS. 61 and 62 show a condition wherein the bias threads B are moved by one pitch by operation of the bias thread feeding device 14 after completion of insertion of the vertical threads Y by the vertical thread rapier 9 which includes two pipes 9a. From this condition, the vertical threads Y are inserted by the vertical thread rapier 9 which includes three pipes 9a and the selvage thread S is inserted into end loops of the vertical threads Y. Insertion of every other one of the vertical threads Y and feeding operation of the bias threads B in a widthwise direction are performed alternately in this manner, and the bias threads B are arranged so that they may make an inclination angle of 60 degrees with respect to the warps z.

Figure 64:
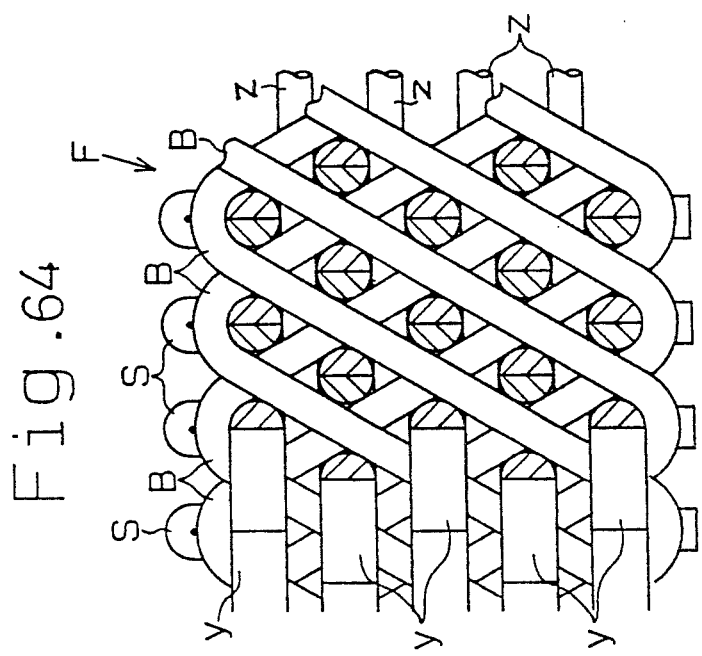
Figure 63:
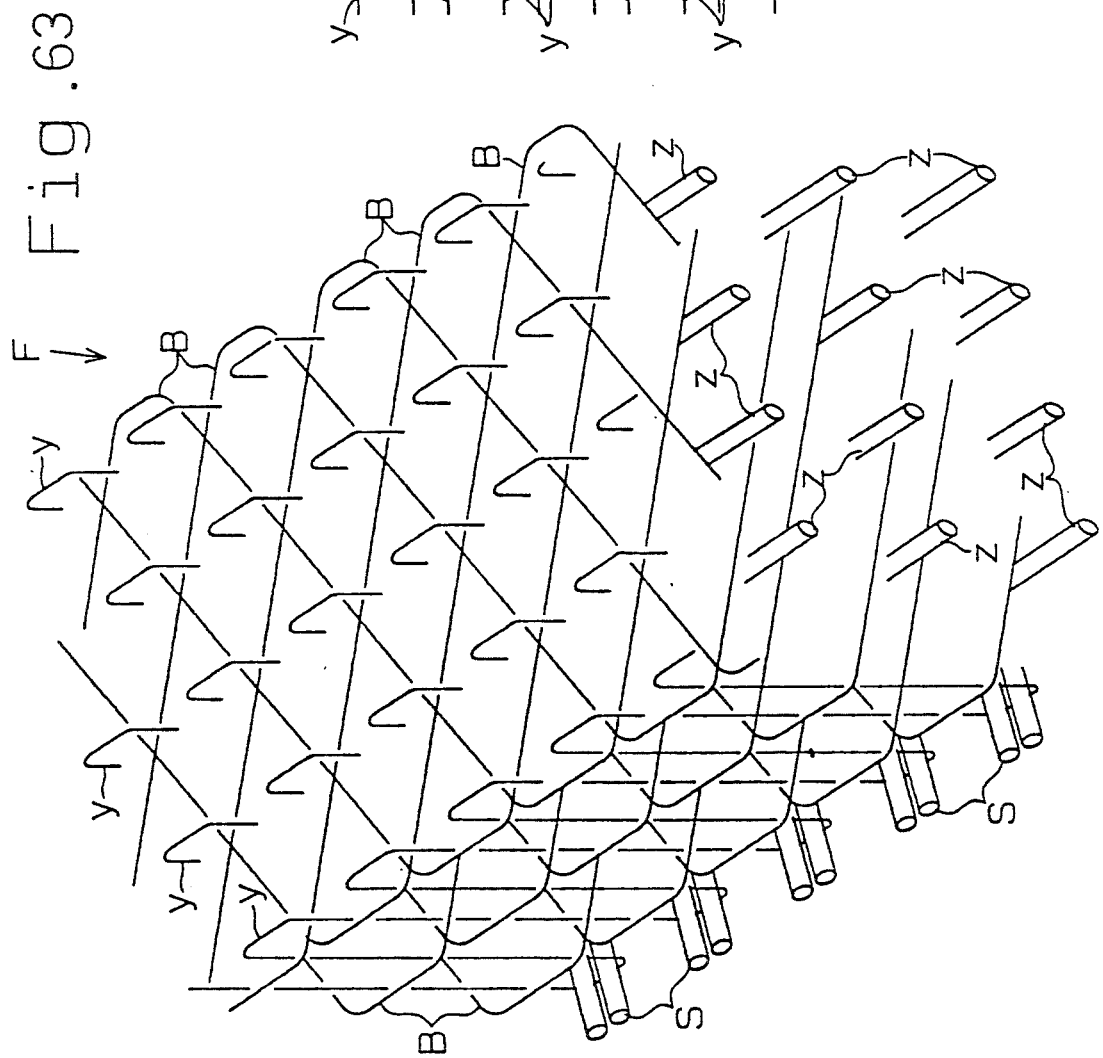

Three dimensional fabric F woven in this manner is constituted such that, as shown in FIGS. 63 and 64, the warps z and the bias threads B constituting three axes in plane intersect each other at an angle of 60 degrees, and can thus be obtained as a totally 4-axis three dimensional fabric F including the vertical threads Y. The three dimensional fabric F has effects that the fiber charging ratio can be readily increased and the thickness of the bias threads B can be increased comparing with a 5-axis fabric and that, where it is used for a composite material, the strength against a force acting in an oblique direction is improved and the strength against shearing compression in the longitudinal direction is increased.

It is to be noted that insertion of the vertical threads divided alternately into two groups may be performed alternately from the opposite direction of the front and rear faces of the woven fabric so that the selvage thread S may be formed on the front and rear faces of the woven fabric, and the vertical threads Y may be inserted using a shuttle, in which case the selvage thread is unnecessary.

We claim:

1. A three dimensional fabric comprising:
    a warp layer including a plurality of warps (z) arranged in parallel with a longitudinal direction of said fabric;
    bias thread layers including a multiplicity of continuous bias threads (B) arranged in such a manner as to be inclined symmetrically to each other with respect to the longitudinal direction of said fabric in a plane parallel to said warp layer, each two of said bias thread layers making a set; and
    a plurality of vertical threads (Y) arranged in a thicknesswise direction of said fabric in perpendicularly intersecting condition to said warps (z) between all adjacent columns of said warp layer and on the opposite outer sides of said columns, said vertical threads being continuous individually for said columns.

2. A three dimensional fabric comprising:
    a warp layer including a plurality of warps (z) arranged in parallel with a longitudinal direction of said fabric;
    bias thread layers including a multiplicity of continuous bias threads (B) arranged in such a manner as to be inclined symmetrically to each other with respect to the longitudinal direction of said fabric in a plane parallel to said warp layer, each two of said bias thread layers making a set;
    a plurality of vertical threads (Y) arranged in a thicknesswise direction of said fabric in perpendicularly intersecting condition to said warps (z) between all adjacent columns of said warp layer and on the opposite outer sides of said columns, said vertical theads being continuous individually for said columns; and
    a weft (x) arranged in a widthwise direction of said fabric in a perpendicularly intersecting condition with said warps (z).

3. A three dimensional fabric according to claim 1 or 2, wherein said bias thread layers exist by a plurality of sets, and those of said bias threads (B) which constitute at least one set of said bias thread layers are folded back intermediately of the full width of said fabric.

4. A three dimensional fabric according to claim 2, wherein said bias thread layers exist by a plurality of sets, and those of said bias thread layers of at least one set are folded back with a predetermined width smaller then the width of said fabric such that the thickness of said fabric varies in its widthwise direction.

5. A three dimensional fabric according to claim 1 or 2, wherein said bias threads (B) constituting each of said bias thread layers each two of which make a set are disposed such that may have an inclination of one direction.

6. A three dimensional fabric according to claim 1 or 2, wherein it has a plurality of sets of said bias thread layers each two of which make a set, and the inclination angle of said bias threads (B) of those said bias thread layers of at least one set is different from the inclination angle of said bias threads (B) of those said bias thread layers of the other set or sets.

7. A method for producing a three dimensional fabric wherein:
    a plurality of warps (z) are stretched in a plurality of layers in a thicknesswise direction of said fabric in a condition wherein they extend in a longitudinal direction of said fabric;
    a plurality of bias threads (B) are stretched in parallel to said warp layers such that each two layers may make a set;
    a vertical thread (Y) is inserted in the thicknesswise direction of said fabric and a loop is formed at an end thereof;
    a selvage thread is inserted into the end loop of said vertical thread (Y); then said vertical thread (Y) is drawn back; then, in a condition wherein said vertical thread (Y) connecting to said fabric being is woven is disposed outside said warps (z) and said bias threads (B), by an action of a feeding device arranged in the widthwise direction of said fabric between the cloth fell position and a bias thread supplying section, the engaging positions of said bias threads (B) with a set made of each two thereof which are in an engaging condition with engaging portions of said feeding device are moved by a predetermined pitch in opposite directions to each other for each of said bias thread layers along the widthwise direction of said fabric to arrange said bias threads (B) obliquely with respect to the longitudinal direction of said fabric; and then insertion of said vertical thread (Y) is performed again.

8. A method for producing a three dimensional fabric, wherein:
a plurality of warps (z) are stretched in a plurality of layers in a thicknesswise direction of said fabric in a condition wherein they extend in a longitudinal direction of said fabric;
a plurality of bias threads (B) are stretch in parallel to said warp layers such that each two layers may make a set;
insertion of a vertical thread (Y) in the thicknesswise direction of said fabric and insertion of a weft (x) in a widthwise direction of said fabric are performed;
in a condition wherein, after completion of insertion of said weft (x) by one cycle, said vertical thread (Y) connecting to said fabric being woven is disposed outside said warps (z) and said bias threads (B), by an action of a feeding device arranged in the widthwise direction of said fabric between the cloth fell position and a bias thread supplying section, the engaging positions of said bias threads (B) with a set made of each two thereof which are in an engaging condition with engaging portions of said feeling device are moved by a predetermined pitch in opposite directions to each for each of said bias thread layers along the widthwise direction of said fabric to arrange said bias threads (B) obliquely with respect to the longitudinal direction of said fabric; and then insertion of said vertical thread (Y) is performed again.

9. A method for producing a three dimensional fabric according to claim 7 or 8, wherein, when said bias threads (B) are to be arranged obliquely with respect to the longitudinal direction of said fabric, by an action of a feeding device which is arranged in the widthwise direction of said fabric between the cloth fell position and said bias thread supplying section and wherein engaging portions which are provided at tow stages so that they may be engaged with said bias threads (B) of each of said bias thread layers each two of which make a set are circulatively moved in a predetermined direction along a moving route in the form of loop extending in the widthwise direction of said fabric, the engaging positions of said bias threads (B) which are in an engaging condition with said engaging portions of said feeding device are moved in the opposite directions to each other between adjacent ones of said bias thread layers while said bias threads (B) connecting from said engaging portions to said thread supplying section are moved, upon movement of said engaging portions, in the same direction.

10. A method for producing a three dimensional fabric according to claim 7 or 8, wherein said bias threads (B) each two of which make a set are stretched by a plurality of sets and, when said bias threads (B) are to be arranged obliquely with respect to the longitudinal direction of said fabric by an action of a feeding device, the feeding pitch of a feeding device corresponding to at least one of said plurality of sets of said bias threads (B) is made different from the feeding pitch of any other feeding device.

* * * * *

UNITED STATES PATENT AND TRADEMARK OFFICE
CERTIFICATE OF CORRECTION

PATENT NO. : 5,137,058

DATED : August 11, 1992

INVENTOR(S) : M. Anahara et al

Page 1 of 2

It is certified that error appears in the above-identified patent and that said Letters Patent is hereby corrected as shown below:

Column 1, line 19, "structional" should read --structural--.

Column 2, lines 2, 3 "increase" should read --increases--; line 25, "and" should read --an--.

Column 3, line 1, "anf" should read --and--; line 43, "processing" should read --producing--.

Column 4, line 15 start new paragraph at "FIG. 1"; line 57, after "away" insert comma --,--.

Column 5, line 14, start new paragraph at "FIGS. 57"; line 49, "frabic" should read --fabric--.

Column 6, line 26, "concludes" should read --includes,--; line 39, "mechanish" should read --mechanism--; line 40, "fram" should read --frame--; line 55, start new sentence at "the".

Column 7, line 12, "on" should read --only--; line 23, "schrew" should read --screw--.

UNITED STATES PATENT AND TRADEMARK OFFICE
CERTIFICATE OF CORRECTION

PATENT NO. : 5,137,058
DATED : August 11, 1992
INVENTOR(S) : M. Anahara et al

It is certified that error appears in the above-identified patent and that said Letters Patent is hereby corrected as shown below:

Column 8, line 7, "totated" should read --rotated--; line 14 before "16" insert --15 disposed at the upper stage are transferred to the screw shaft--; line 42, "thread" should read --threads--.

Column 11, line 41, after "fabric" change period "." to comma --,--; change "The" to --the--.

Column 13, line 42, "uniformly" should read --uniformity--.

Column 15, lines 23 "or" (first occurrence) should read --of--; line 24, before "a" insert --9--.

Column 22, line 39, after "those" insert --of--.

Signed and Sealed this

Thirtieth Day of November, 1993

Attest:

BRUCE LEHMAN

Attesting Officer

Commissioner of Patents and Trademarks